(12) United States Patent
McKnew et al.

(10) Patent No.: US 12,472,860 B2
(45) Date of Patent: Nov. 18, 2025

(54) AUTONOMOUS VEHICLE WITH A SMART RAMP FOR WHEELED CARRIERS

(71) Applicant: GM Cruise Holdings LLC, San Francisco, CA (US)

(72) Inventors: Jennifer Devar McKnew, Petaluma, CA (US); Michele Lee, Chicago, IL (US)

(73) Assignee: GM Cruise Holdings LLC, San Francisco, CA (US)

( * ) Notice: Subject to any disclaimer, the term of this patent is extended or adjusted under 35 U.S.C. 154(b) by 213 days.

(21) Appl. No.: 18/352,693

(22) Filed: Jul. 14, 2023

(65) Prior Publication Data

US 2025/0018848 A1    Jan. 16, 2025

(51) Int. Cl.
*B60P 1/43*    (2006.01)

(52) U.S. Cl.
CPC .................................... *B60P 1/431* (2013.01)

(58) Field of Classification Search
CPC ............ B60P 1/431; B60P 1/43; B65G 69/28; B65G 69/287
USPC ........................................................ 280/166
See application file for complete search history.

(56) References Cited

U.S. PATENT DOCUMENTS

| | | | | |
|---|---|---|---|---|
| 4,084,713 A | * | 4/1978 | Rohrs | A61G 3/061 414/537 |
| 6,729,829 B2 | * | 5/2004 | Zimmer | A61G 3/02 414/921 |
| 10,493,893 B2 | * | 12/2019 | Matsuoka | B60P 1/436 |
| 11,001,186 B2 | * | 5/2021 | Bryant | B60P 1/649 |
| 12,122,351 B2 | * | 10/2024 | Date | A61G 3/061 |
| 2016/0199236 A1 | * | 7/2016 | Ford | E04F 11/00 14/69.5 |

* cited by examiner

*Primary Examiner* — John D Walters
(74) *Attorney, Agent, or Firm* — Honigman LLP; Matthew H. Szalach; Jonathan P. O'Brien

(57) ABSTRACT

Autonomous vehicles can offer affordable, accessible, and efficient transportation for passengers and cargo. For passengers with different mobility abilities, it can be a challenge to enter and exit an autonomous vehicle. It may also be difficult to bring a wheeled carrier in and out of an autonomous vehicle. A smart ramp can be included with an autonomous vehicle to improve the experience and safety of those with different mobility abilities, and to make it easier for wheeled carriers to go up and go down the ramp. The smart ramp has actuatable tiles that can be selectively actuated based on the position of a wheel of a wheeled carrier and a direction of travel of the wheeled carrier. The tiles may have a rubber-like material on a top side to provide grip and traction for users of the ramp.

20 Claims, 17 Drawing Sheets

AUTONOMOUS VEHICLE WITH A SMART RAMP FOR WHEELED CARRIERS

TECHNICAL FIELD

The present disclosure relates generally to autonomous vehicles (AVs), and more particularly, to a smart ramp provided with AVs.

BACKGROUND

AVs, also known as self-driving cars, driverless vehicles, and robotic vehicles, may be vehicles that use multiple sensors to sense the environment and move without human input. Technology in the AVs may enable the vehicles to drive on roadways and to perceive the vehicle's environment accurately and quickly, including obstacles, signs, and traffic lights. AVs can be used to transport passengers (e.g., human beings, animals, etc.) and cargo.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

Overview

Figure 1:
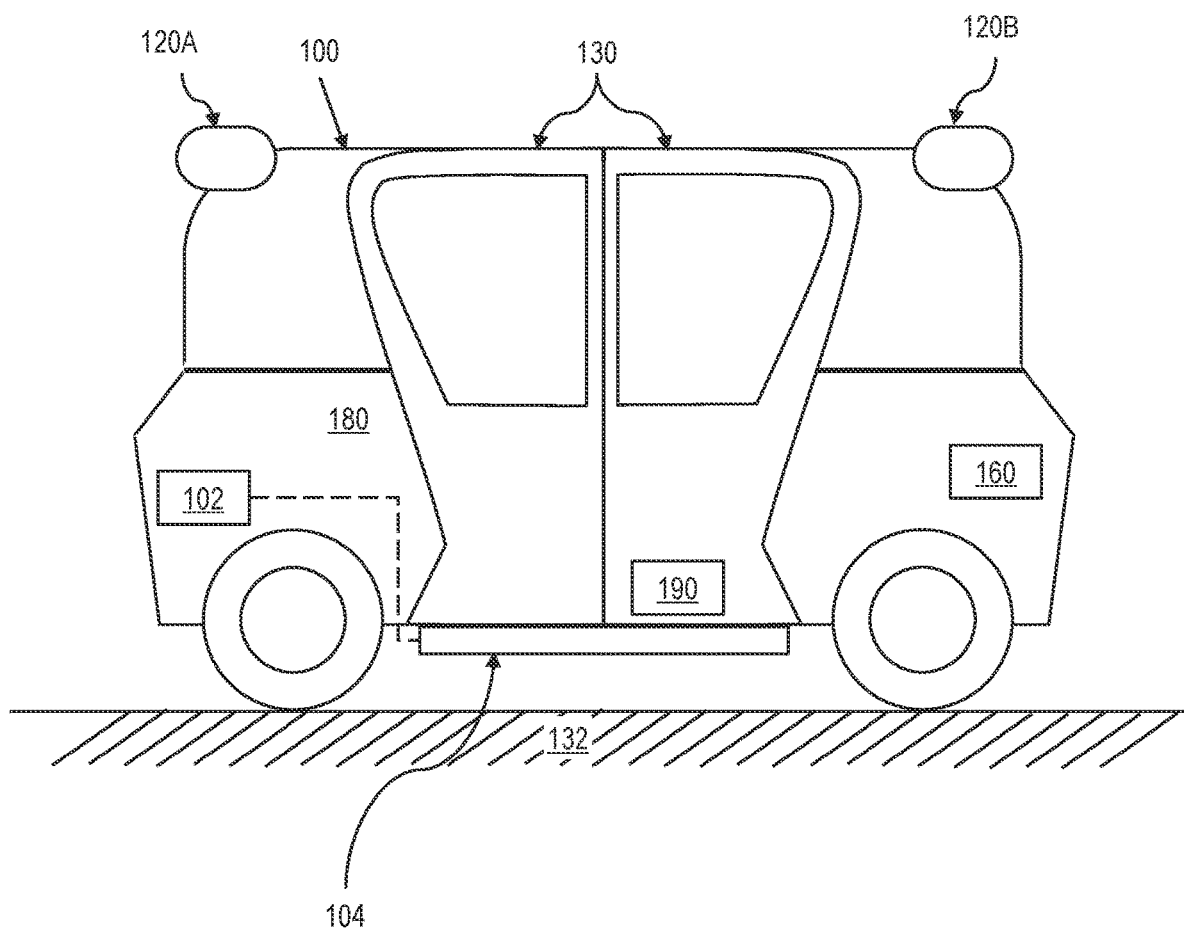
FIG. 1 illustrates an exemplary AV having a smart ramp in a retracted state, according to some embodiments of the disclosure.

AVs can provide a variety of services, such as ride hailing (including ride sharing), and delivery. Ride hailing allows users to request rides or trips, where the rides/trips are serviced by a fleet of AVs. Delivery allows various users or businesses to load item(s) onto an autonomous vehicle, which will deliver the loaded item(s) to an intended recipient to a specified drop-off location. These services are not encumbered by staffing and scheduling of drivers, and thus can be a viable and attractive alternative to services provided by vehicles requiring a driver.

AVs can offer affordable, accessible, and efficient transportation for passengers and cargo. For passengers with different mobility abilities, it can be a challenge to enter and exit an autonomous vehicle. It may also be difficult to bring a wheeled carrier in and out of an autonomous vehicle. Wheeled carriers may include carriers that have wheeled mechanisms (e.g., wheels) and can transport human beings, animals, items, cargo, etc.

Some vehicles such as vans, buses, and trucks, may include a large metal ramp for passengers and/or cargo to enter and exit the vehicle. Metal ramps may take up a significant amount of space in the vehicle. When the metal ramps are wet or icy (e.g., during inclement weather conditions), the surface of metal ramps may be slick. Wheeled carriers are not always equipped with wheels having suitable treads for slick surfaces. Other users of the ramp (e.g., human beings, animals, etc.) may not be wearing shoes that have suitable treads for slick surfaces. To use the metal ramp, passengers with different mobility abilities may be assisted by a caregiver or driver of the vehicle when going up and down the ramp.

When some of these challenges are overcome, AVs and other transportation vehicles may become more accessible to a wider community. Increasing accessibility to transportation has the potential to increase economic opportunities, increase mobility, increase personal independence, and increase access to medical care and other types of services.

To address some of the technical issues, a smart ramp can be included with an AV to improve the experience and safety of those with different mobility abilities when entering and exiting the AV, and to make it easier for wheeled carriers to go up and go down the ramp. The smart ramp may include a contact side that offers more grip and traction for wheeled carriers than a metal ramp. The smart ramp can include mechanisms that can prevent wheeled carriers trying to go up the ramp from rolling down the ramp unintentionally. The smart ramp can include mechanisms that can prevent wheeled carriers from going down a ramp too quickly. The mechanisms can include actuatable tiles that can be selectively actuated based on the position of a wheel of a wheeled carrier and the direction of travel of the wheeled carrier. The tiles may have a material on the top surface of the tiles to provide grip and traction for users of the ramp. The tiles may have a shape or shaped surface that can stop a wheel from rolling down a ramp, and/or slow down the speed of the wheel rolling down a ramp. The tiles may have different actuated states that can achieve different effects on the wheel of the wheeled carrier on a ramp. For example, a particular actuated state may favor or benefit the wheeled carrier going up the ramp. A particular actuated state may favor or benefit the wheeled carrier going down the ramp. The position of the wheel and/or the direction of travel may be determined intelligently, e.g., using sensor data captured by sensor(s) on the AV or sensor(s) on the ramp. The direction of travel may be determined from the use context of the AV and the ramp. The direction of travel may be determined from user input.

For passengers with different mobility abilities, a smart ramp can increase passengers' access to AVs. The smart ramp can also decrease physical strain and increase comfort for those passengers. In some cases, the smart ramp can lessen the chances of those passengers falling, slipping, and/or falling.

While many examples of the smart ramp are described in use with an autonomous vehicle, the smart ramp may be used with other types of (passenger) vehicles that can transport passengers and/or cargo, such as semi-autonomous vehicles, manually operated vehicles, aircrafts, trains, trams, ships, etc. Users of the smart ramp may be animate or inanimate. Users of the smart ramp may include a portion or part of an object. Users of the smart ramp may include a portion or part of a person or animal. One type of user of the smart ramp may include wheeled carriers. Wheeled carriers can include wheelchairs (manual, electric, or hybrid), strollers, dollies, luggage, pushcart, roller cart, roller bag, etc. Another type of user of the smart ramp may include human beings and animals that may be on foot.

Exemplary AV Having a Smart Ramp

Figure 2:
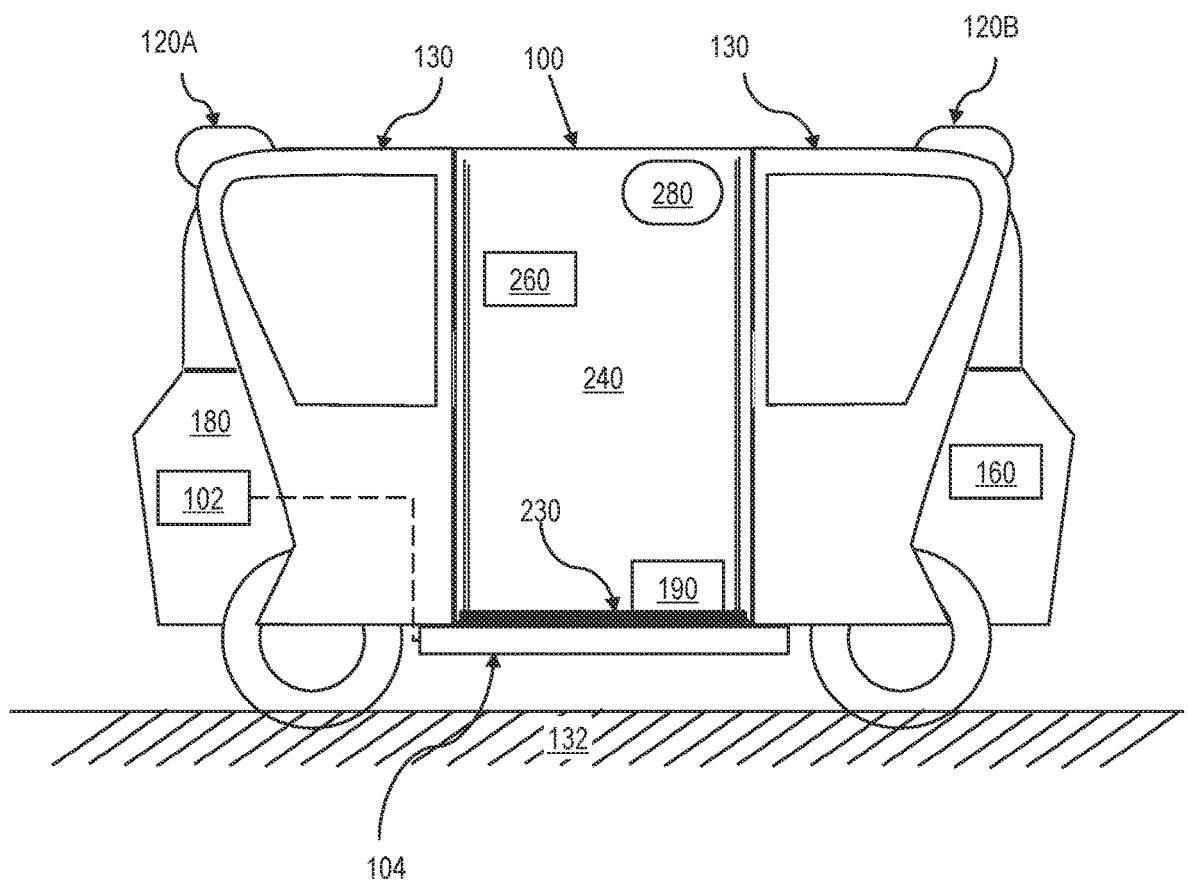
FIG. 2 illustrates an exemplary AV having a smart ramp in a retracted state, according to some embodiments of the disclosure.
Figure 3:
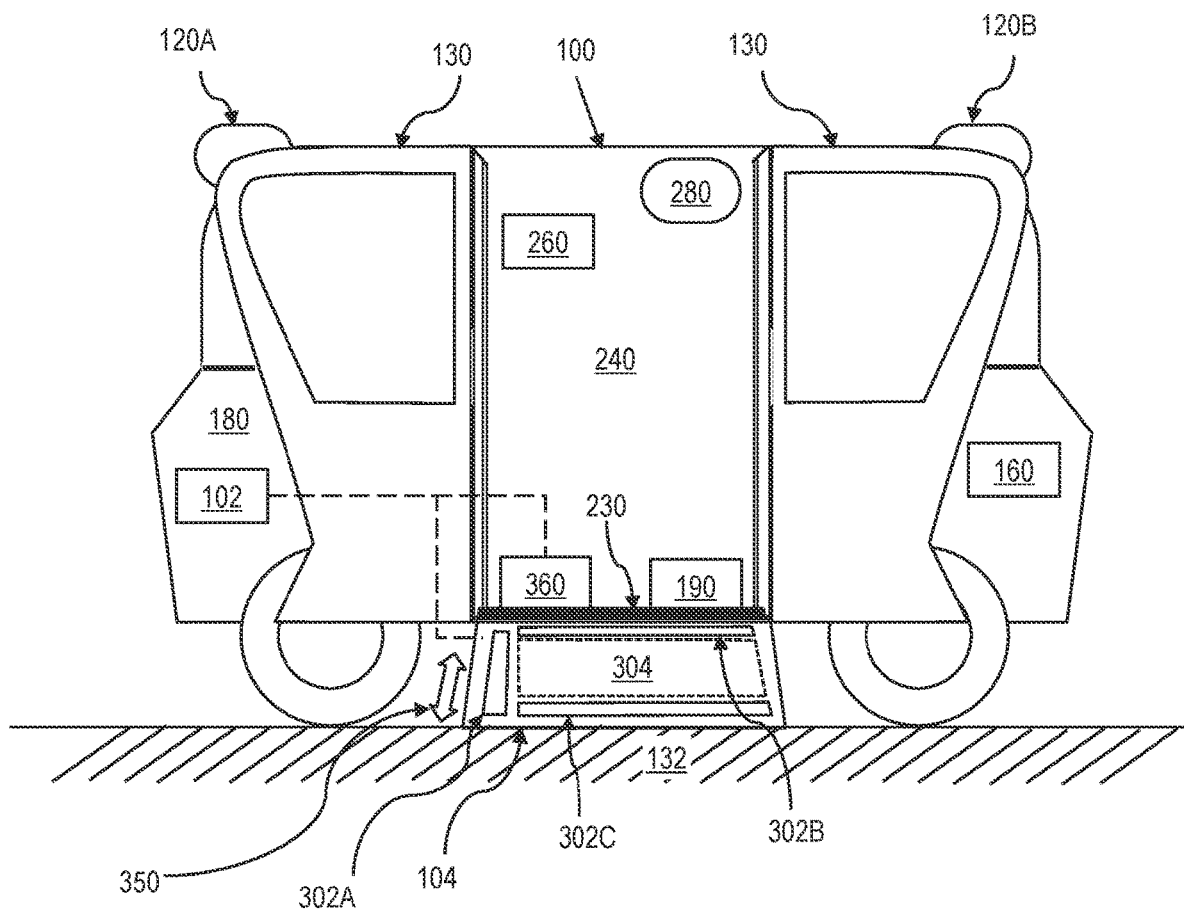
FIG. 3 illustrates an exemplary AV having a smart ramp in an extended state, according to some embodiments of the disclosure.
Figure 4:
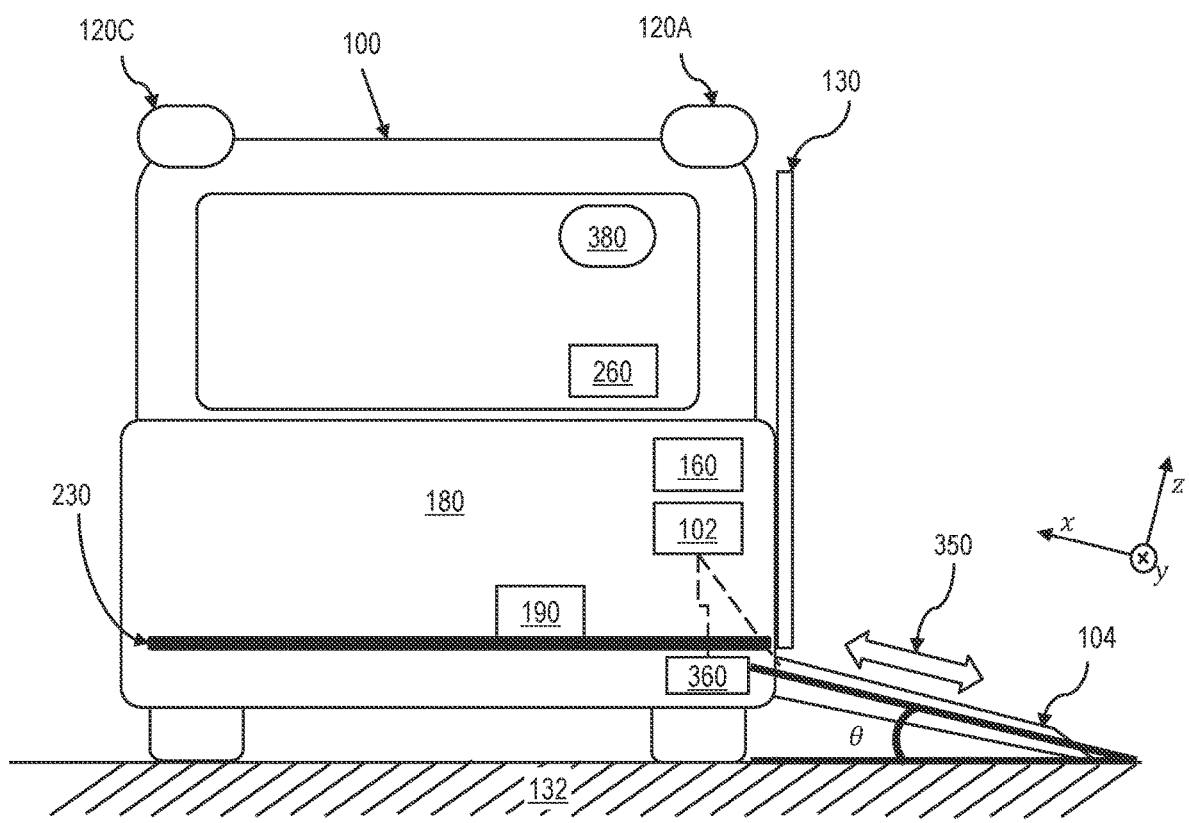
FIG. 4 illustrates the exemplary AV of FIG. 3 when viewed from the back of the exemplary AV, according to some embodiments of the disclosure.
Figure 5:
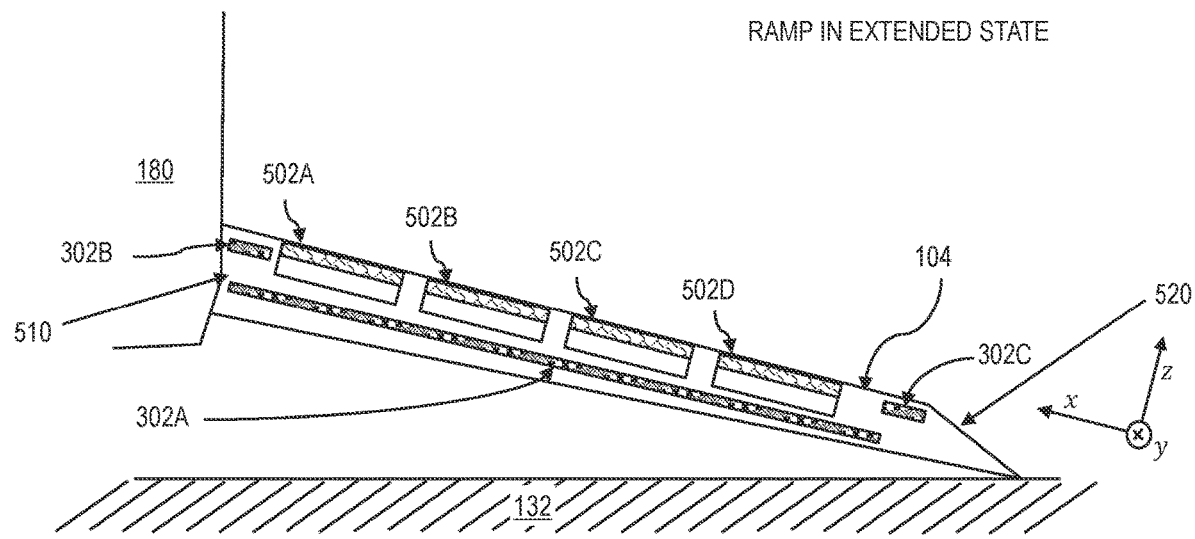
FIG. 5 shows a closer view of the exemplary smart ramp of FIG. 4, according to some embodiments of the disclosure.
Figure 6:
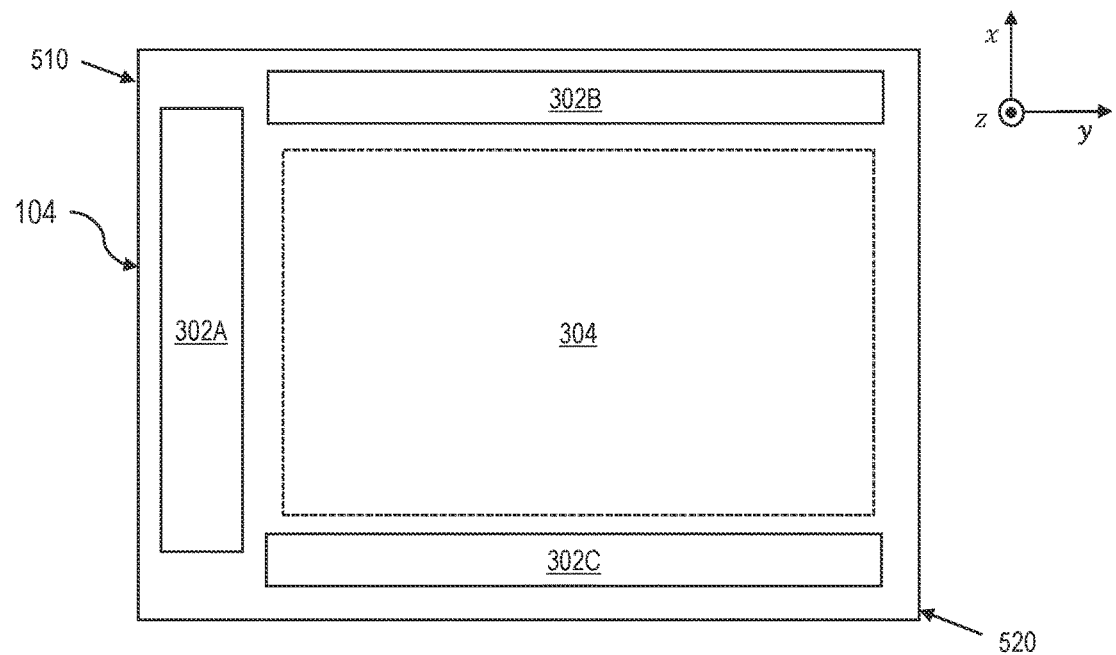
FIG. 6 illustrates an exemplary smart ramp, when directly viewing a contact side of the exemplary smart ramp, according to some embodiments of the disclosure.

FIGS. 1-6 illustrate embodiments of smart ramp 104, according to some embodiments of the disclosure. FIG. 1 illustrates exemplary AV 100 having smart ramp 104 in a retracted state, according to some embodiments of the disclosure. In FIG. 1, the doors 130 are in a closed state. FIG. 2 illustrates exemplary AV 100 having smart ramp 104 in a retracted state, according to some embodiments of the disclosure. In FIG. 2, the doors 130 are in an open state, exposing a vehicle cabin 240 to surroundings of AV 100. FIG. 3 illustrates exemplary AV 100 having smart ramp 104 in an extended state, according to some embodiments of the disclosure. FIGS. 1-3 depict AV 100, when viewed from one of the sides where doors 130 are located (e.g., right side). FIG. 4 illustrates exemplary AV 100 having smart ramp 104 in an extended state as seen in FIG. 3, when viewed from one of the sides where doors 130 are not located (e.g., back side), according to some embodiments of the disclosure. FIG. 5 illustrates smart ramp 104 (close-up of smart ramp 104 depicted in FIG. 4), according to some embodiments of the disclosure. FIG. 5 illustrates a view of smart ramp 104, as if a cross-section is made in the plane formed in the x and z directions. FIG. 6 illustrates a view of smart ramp 104, when directly viewing a contact side of the smart ramp 104 (on a plane formed in the x and y directions), according to some embodiments of the disclosure.

AV 100 may include vehicle body 180, which can enclose vehicle cabin 240. Vehicle cabin 240 may be a space that can transport one or more passengers and/or cargo (including wheeled carriers). Vehicle body 180 may include vehicle floor 230, offering a floor surface for passengers and/or cargo in vehicle cabin 240. AV 100 may be on ground surface 132. Vehicle floor 230 and ground surface 132 can be at different elevations.

AV 100 may include smart ramp 104. For simplicity, smart ramp 104 may be referred to as ramp 104 herein. Ramp 104 is a structure that can extend from an edge of vehicle floor 230 to ground surface 132. Ramp 104 can have a retracted state, where ramp 104 may be stowed away. Ramp 104, when not in use, may be stowed away in a retracted state. Ramp 104 may have an extended state, where ramp 104 is actuated to reach a position where ramp 104 connects ground surface 132 and vehicle floor 230. Ramp 104 may provide a sturdy and steady surface for users of the ramp to go between ground surface 132 and vehicle floor 230 without having to step up or step down. Ramp 104, when in use, may be in an extended state, connecting the vehicle floor 230 and the ground surface 132. Ramp 104 may be in an intermediate state or moving state when ramp 104 changes position between a retracted state and an extended state. Ramp 104 can be primarily composed of rigid materials.

AV 100 may include a ramp stowaway area. A ramp stowaway area may be used to store ramp 104 with AV 100 when ramp 104 is not in use. In some cases, the ramp stowaway area may be underneath vehicle floor 230 (e.g., underneath chassis of AV 100). In some cases, the ramp stowaway area is inside vehicle floor 230 (e.g., a false floor system).

AV 100 may include ramp actuator 360. Ramp actuator 360 may actuate ramp 104 to change a state or position of ramp 104 relative to AV 100. Ramp actuator 360 may retract ramp 104 from the ground surface 132 to the ramp stowaway area to cause ramp 104 to be in a retracted state, as seen in FIGS. 1-2. Ramp actuator 360 may extend ramp 104 from the ramp stowaway area to a ground surface 132 to cause ramp 104 to be in an extended state, as seen in FIGS. 3-5. The motion of ramp 104 caused by ramp actuator 360 is illustrated by arrow 350. Ramp actuator 360 may include one or more of: linear actuator, and rotational actuator.

Referring to FIG. 4, ramp 104, when in an extended state, may have an incline. The angle of the incline is shown as θ. When ramp 104 is in use, the difference in elevation between vehicle floor 230 and ground surface 132 may vary. In some cases, angle of the incline θ may be large when ground surface 132 differs in elevation greatly from the vehicle floor 230, and/or when the length of ramp 104 is relatively short. While using ramp 104 to connect vehicle floor 230 and a curb of ground surface 132 may lessen the angle of the incline θ, a curb may not always be available when ramp 104 is to be used. It is not always possible to offer a very long ramp 104. Users of a ramp that does not have the features of ramp 104 may have greater difficulty going up and going down the ramp when the angle of the incline θ is large.

Ramp 104 thus includes one or more described features to alleviate some of these concerns. As depicted in FIG. 5, ramp 104 includes actuatable tiles 502 (e.g., actuatable tile 502A, actuatable tile 502B, actuatable tile 502C, and actuatable tile 502D). Actuatable tiles 502 may be in an unactuated position. The actuatable tiles, such as actuatable tiles 502, may be arranged across a length of ramp 104 in the x direction. The actuatable tiles, such as actuatable tiles 502, may be arranged across a width of ramp 104 in the y direction. The actuatable tiles, such as actuatable tiles 502, may be arranged across a region 304 in the x and y directions. The actuatable tiles 502 may be arranged across the contact side of ramp 104 (the side that contacts users of ramp 104). In the illustration depicted in FIGS. 3 and 6, the actuatable tiles may be arranged spatially in region 304 of the contact side of ramp 104. Exemplary geometric and/or spatial patterns for spatially arranging the actuatable tiles in region 304 are illustrated in FIGS. 22-32.

In some embodiments, at least a subset of or all of the actuatable tiles includes a top surface (e.g., on the contact side of the actuatable tile or the side of the top surface away from the ground surface and faces a user of the ramp) that is made from a rubber-like material. In some cases, a portion or part of the top surface may include a rubber-like material. Actuatable tiles 502 depicted in FIG. 5 has a shaded portion indicating that actuatable tiles 502 includes a rubber-like material top surface. The rubber-like material can offer grip and traction for users of ramp 104, even when the actuatable tiles are in an unactuated position. The top surface may include one or more of the following materials: natural rubber, synthetic rubber, silicone, nitrile, latex, vinyl, neoprene, and soft plastic, etc. In some embodiments, at least a subset of or all of the actuatable tiles includes a top surface that is uneven or has surfaces that can offer friction and traction for users of ramp 104. Uneven surfaces can offer greater surface area to which users can make contact to improve traction. Exemplary actuatable tiles are illustrated in FIGS. 12-21.

Ramp 104 may include tile actuators (not shown explicitly in FIGS. 1-6) to selectively actuate the actuatable tiles. An actuatable tile may have different positions. The positions can include an unactuated position, and one or more actuated positions. Tile actuators may cause respective actuatable tiles to be in one of the positions. Tile actuators may include one or more of: linear actuator, and rotational actuator. Tile actuators may cause one or more of: rotary motion, linear motion, oscillating motion, and reciprocating motion. Tile actuators may apply one or more forces mechanically to one or more corresponding actuatable tiles to cause the one or more corresponding actuatable tiles to change positions. Tile actuators may include one or more mechanisms, such as motors, pneumatics, hydraulics, pistons, pumps, pulleys, belt drives, gear trains, levers, magnetics, and cams (e.g., circular, pear, snail, and roller).

Exemplary manners in which an actuatable tile may be actuated individually are illustrated in FIGS. 8A-C and 9A-9D. Exemplary manners in which the actuatable tiles can be selectively actuated to benefit different use cases of ramp 104 are illustrated in FIGS. 8A-C, 9A-9D, 10A-C, and 11A-E.

In some embodiments, ramp 104 may include one or more sensors 302 (examples are shown as sensors 302A-C) provided with ramp 104. The one or more sensors 302 may be used to sense a position of a user (e.g., a wheel of a wheeled carrier) on ramp 104. Position may be defined as a point or area of ramp 104 (e.g., in a plane defined by the x and y direction) with which a user is in contact. One or more sensors 302 may include a linear position sensor. A linear position sensor provided with ramp 104 may detect position of a user (and additional position(s) of additional user(s)) on ramp 104 along a direction. A linear position sensor may include an array of sensors arranged in the direction, where sensors can individually detect the presence of a user on a sensor or near (in the proximity of) the sensor. The position of the user along the direction can be determined based on which sensor(s) in the array of sensors detects the presence of the user and which sensors do not detect the presence of the user. Individual sensors in the array of sensors may sense or detect the presence of a user based on changes in light, capacitance, inductance, resistance, potential, weight, force, pressure, temperature, sound, etc. The linear position sensor can output sensor data that indicates the position of the user. From the position information collected over time, the speed or velocity of the user (e.g., change in position over time) may be derived or deduced. From the position information collected over time, a direction of travel of the user may be derived or deduced.

Some examples of the one or more sensors 302A-C are depicted in FIGS. 3 and 5-6. Ramp 104 may include a first linear position sensor 302A arranged with ramp 104 to sense a position of a user along a first direction (e.g., x direction as depicted). First linear position sensor 302A may be placed with ramp 104 near a side of the ramp 104 to sense a position of a user traveling up and down a ramp to determine a position of the user in the x direction. Ramp 104 may include a second linear position sensor 302B arranged with ramp 104 to sense a position of a user along a second direction perpendicular to the first direction (e.g., y direction as depicted). Second linear position sensor 302B may be located at a proximal end 510 of ramp 104. Second linear position sensor 302B may be used to detect a user of ramp 104 beginning a descent down ramp 104. Second linear position sensor 302B may be used to sense or determine expected contact positions of a user of ramp 104 beginning a descent down ramp 104 along the y direction. Ramp 104 may include a third linear position sensor 302C arranged with ramp 104 to sense a position of a user along the second direction perpendicular to the first direction (e.g., y direction as depicted). Third linear position sensor 302C may be located at a distal end 520 of ramp 104. Third linear position sensor 302C may be used to detect a user of ramp 104 beginning an ascent up ramp 104. Third linear position sensor 302C may be used to sense or determine expected contact positions of a user of ramp 104 beginning an ascent up ramp 104 along the y direction. Using at least two (linear position) sensors 302 arranged along the x and y directions respectively may sense or detect the position of the user in two dimensions (e.g., the x, y coordinates of the user on ramp 104 on the plane defined by the x and y directions).

In some cases, the position of a user may be sensed by sensors provided with actuatable tiles (in addition to or in place of one or more sensors 302A-C). In other words, one or more actuatable tiles or at least a subset of the actuatable tiles may include sensors embedded therein. An actuatable tile with a sensing mechanism (e.g., one or more sensors embedded therein) may sense whether a user is on top of the actuatable tile. An array (e.g., row or column) of such actuatable tiles with sensing mechanisms may form a linear position sensor. A grid or spatial arrangement in two directions/dimensions (e.g., in the x and y directions) of such actuatable files with sensing mechanisms may sense a position of the user across the two dimensions on ramp 104. Sensing mechanisms embedded with the actuatable files may detect changes in one or more of: light, capacitance, inductance, resistance, potential, weight, force, pressure, temperature, sound, etc.

In some cases, the position of a user may be sensed by sensors provided underneath the actuatable tiles (in addition to or in place of one or more sensors 302A-C). The sensors may be arranged in an array, such as in a row or column, to form a linear position sensor. The sensors may be arranged in a grid or spatial arrangement in two directions/dimensions (e.g., in the x and y directions). Such sensors may sense a position of the user across the two dimensions on ramp 104.

In some cases, actuatable tiles may be spatially arranged across almost entirely on the contact side of ramp 104. Such actuatable tiles having a rubber material top surface may offer traction and grip across almost the entire contact side of ramp 104.

In some cases, the position of a user may be sensed by sensors arranged in between or (immediately) adjacent to the actuatable tiles (in addition to or in place of one or more sensors 302A-C). Sensors may be interleaved between or positioned between at least some rows of the actuatable tiles. The arrangement of sensors and actuatable tiles may alternate row by row. Sensors may be interleaved between or positioned in between at least some columns of actuatable tiles. The arrangement of sensors and actuatable tiles may alternate column by column. Sensors may be arranged in (at least a subset of) gaps or areas in between the actuatable tiles.

In some cases, the position of a user may be sensed by other types of position sensors (e.g., sensors that may use time-of-flight mechanisms, or detection and ranging mechanisms).

AV 100 may include a suite of sensors. The suite of sensors may sense an environment of AV 100. As depicted in FIGS. 1-4, sensors 120 (e.g., sensor(s) 120A, sensor(s) 120B, and sensor(s) 120C) in the suite of sensors may be provided or mounted near corners of a top side of AV 100 (e.g., mounted on or built into vehicle body 180). In some cases, sensors 120 of the suite of sensors may be mounted on top of AV 100. Sensors 120A and 120B may have a field of view of a user using ramp 104. A user using ramp 104 may include a user that is about to use, is using actively, and/or has just finished using ramp 104. The suite of sensors may include sensor(s) 280 inside vehicle cabin 240. Sensor(s) 280 may have a field of view of a user using ramp 104. Sensors that have a field of view of the user using ramp 104 may be used to sense a position of the user. From the position of the user, direction of travel and/or speed/velocity may be determined or derived. Examples of such sensors may include:

- One or more cameras in sensor(s) 280 in the vehicle cabin 240,
- One or more time-of-flight sensors in sensor(s) 280 in the vehicle cabin 240,
- One or more occupancy sensors in sensor(s) 280 in the vehicle cabin 240,
- One or more people sensors in sensor(s) 280 in the vehicle cabin 240,
- One or more cameras in sensors 120 located outside of vehicle cabin 240,
- One or more light detection and ranging (LIDAR) in sensors 120 located outside of vehicle cabin 240,
- One or more radio detection and ranging (RADAR) in sensors 120 located outside of vehicle cabin 240,
- One or more ultrasonics sensors in sensors 120 located outside of vehicle cabin 240, and
- One or more time-of-flight sensors in sensors 120 located outside of vehicle cabin 240.

AV 100 may include a user input/output (I/O) device 260, as illustrated in FIGS. 2-4. In some cases, user I/O device 260 may be inside vehicle cabin 240. In some cases, user I/O device 260 may be outside of vehicle body 180. User I/O device 260 allows users of AV 100 and ramp 104 to provide user input (e.g., a user command, user preferences, user settings, etc.). User I/O device 260 may generate output that can be perceived by users of AV 100 and ramp 104. User I/O device 260 may include one or more of the following:

- One or more microphones to generate audio signals for an audio user interface that accepts voice commands from a human (or animal),
- One or more speakers to generate audio output (e.g., audio sounds or synthesized speech) to communicate information to a human (or animal),
- One or more display screen to generate a graphical user interface to communicate information to a human (or animal),
- One or more touch-sensitive display screens to generate a graphical user interface to communicate information to a human (or animal) and/or receive user input (e.g., user command, user selection, text),
- One or more keys or buttons to receive user input (e.g., button press indicating user selection or user intent), and
- Client computing device communicably connected with AV 100 (e.g., client computing device 3470 in FIG. 34) having a ride hailing and/or delivery application implemented thereon.

AV 100 may include controller 102. Controller 102 may generate instructions, commands, and/or control signals to control AV 100. In some embodiments, controller 102 may generate instructions commands and/or control signals to control mechanical and electrical systems of AV 100 to cause AV 100 to navigate on roadways. In some embodiments, controller 102 control ramp actuator 360 and/or tile actuators to intelligently operate ramp 104. For example, actuatable tiles may be selectively actuated based on how the ramp is being used. In some embodiments, controller 102 may determine the direction of travel of the user of ramp 104 (e.g., a wheeled carrier). Controller 102 may determine a direction of travel based on contextual cues. Controller 102 may determine a direction of travel based on user input. Controller 102 may determine a direction of travel based on sensor data. Controller 102 may determine the position of a user on the ramp based on sensor data. Actuatable tiles may be selectively actuated based on the position of a user on the ramp. Based on the direction of travel of the user and/or the position of the user on the ramp, controller 102 may determine, generate, and send one or more commands to tile actuators to selectively actuate the actuatable tiles (e.g., actuatable tiles 502 as illustrated FIG. 5, actuatable tiles arranged in region 304 as illustrated FIGS. 3 and 6).

AV 100 may include a power source 160. Power source 160 may provide power to components illustrated and described herein. Power source 160 may power AV 100 (e.g., mechanical and electrical systems of AV 100). Power source 160 may power ramp am actuator 360. Power source 160 may power tile actuators. Power source 160 may power sensors of AV 100 (e.g., sensors 120, and sensors 380). Power source 160 may power one or more sensors 302 provided with ramp 104. Power source 160 may power sensing mechanisms of actuatable tiles (if provided).

In some cases, AV 100 may include a wheeled mobility device securement system 190 to secure a wheeled mobility device to vehicle floor 230. Wheeled mobility device may be a user of ramp 104. Ramp 104 can be used to allow the wheeled mobility device to enter and exit vehicle cabin 240. Once the wheeled mobility device has entered vehicle cabin 240 using ramp 104, the wheeled mobility device may be secured to vehicle floor 230 while the AV is transporting the wheeled mobility device from one place to another. The wheeled mobility device may be occupied or unoccupied.

Exemplary Components of AV with a Smart Ramp

Figure 7:
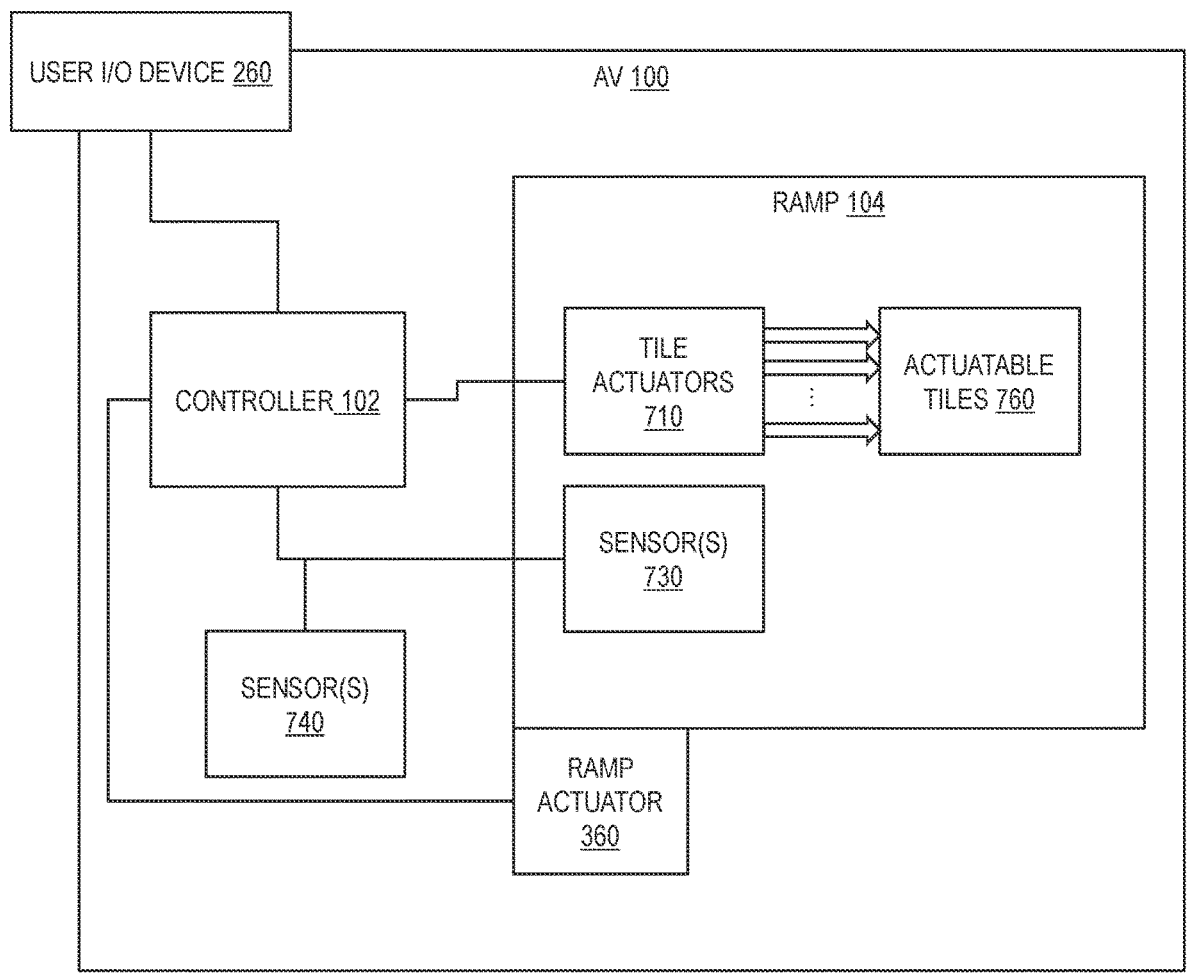
FIG. 7 is a block diagram illustrating components of an exemplary AV having an exemplary smart ramp, according to some embodiments of the disclosure.

FIG. 7 is a block diagram illustrating components of an exemplary AV 100 having an exemplary smart ramp 104, according to some embodiments of the disclosure. AV 100 may include one or more of: controller 102, ramp 104, ramp actuator 360, and sensors 740. Ramp 104 may include one or more of: tile actuators 710, actuatable tiles 760, and sensors 730.

One or more tile actuators 710 may (selectively) actuate actuatable tiles 760 in a manner described herein. Tile actuators 710 may be mechanically or magnetically coupled with the actuatable tiles 760. At least some or all of the one or more tile actuators 710 may cause one or more actuatable tiles 760 to be in one of a plurality of states/positions. Exemplary states/positions are illustrated in FIGS. 8A-C and 9A-D. A tile actuator may actuate one or more corresponding actuatable tiles. A tile actuator may actuate an individual actuatable tile. A tile actuator may actuate a set or ensemble of actuatable tiles (e.g., a row of actuatable tiles, a column of actuatable tiles, etc.) at the same time. A tile actuator may cause an actuatable tile to be in one of a plurality of positions (or states) and/or cause the actuatable tile to transition between different positions (or states).

Ramp 104 may include one or more sensors 730 to sense a position of a user on ramp 104. Ramp 104 may include one or more sensors 730 to sense the direction of travel of a user on ramp 104. Ramp 104 may include one or more sensors 730 to sense the speed or velocity of an user on ramp 104. Examples of one or more sensors 730 may include sensors 302 as described herein and/or other types of position sensors envisioned by the disclosure. In some cases, the one or more sensors 730 may be provided with actuatable tiles 760.

AV 100 may include one or more sensors 740 to sense a position of a user on ramp 104. AV 100 may include one or more sensors 740 to sense the direction of travel of a user on ramp 104. AV 100 may include one or more sensors 740 to sense the speed or velocity of a user on ramp 104. Examples of one or more sensors 740 may include sensors 120 and/or sensors 380 as described herein.

In some embodiments, controller 102 may generate instructions, commands, and/or control signals to control ramp actuator 360. Controller 102 may cause ramp actuator 360 to be in different states/positions, or to transition between different states/positions. States of ramp actuator 360 may include an extended state and a retracted state.

In some embodiments, controller 102 may generate instructions, commands, and/or control signals to control tile actuators 710 of ramp 104. Controller 102 may actuate all of actuatable tiles 760, if appropriate. Controller 102 may selectively control tile actuators of ramp 104 to actuate a selected subset of actuatable tiles 760, if appropriate. Controller 102 may control a given tile actuator to cause one or more corresponding actuatable tiles to be in one of the states/positions of the corresponding actuatable tiles. Possible states/positions may include an unactuated state and one or more actuated states. Controller 102 may select an actuated state from a plurality of different actuated states for the selected actuatable tile(s) to actuate. The instructions/commands, and/or control signals can include commands to cause the selected actuatable tile(s) to reach or achieve the selected actuated state. The selecting of the actuated state from the plurality of different actuated states may be based on a user-provided speed or velocity setting (e.g., how fast the user wishes to go up and/or down the ramp 104).

In some embodiments, controller 102 may receive sensor data from sensors 740 of AV 100 or provided with AV 100. Controller 102 may receive sensor data from sensors 730 of or with ramp 104. Sensor data may be used as input by controller 102 to determine a direction of travel of the user of ramp 104 and/or a position of user on ramp 104. Sensor data may be used by controller 102 when generating instructions, commands, and/or control signals for ramp actuator 360 and/or tile actuators 710. In some embodiments, controller 102 may receive user-provided input, e.g., provided through user I/O device 260. User-provided input may be used by controller 102 when generating instructions, commands, and/or control signals for ramp actuator 360 and/or tile actuators 710. Controller 102 may implement an algorithm or a computer-implemented process/method to select some or all of the actuatable tiles 760 to actuate with tile actuators 710 based on the sensor data and/or user-provided input. Controller 102 may implement an algorithm or a computer-implemented process/method to determine suitable target states of the actuatable tiles 760 to achieve with tile actuators 710 based on the sensor data and/or user-provided input.

Controller 102 may be implemented by instructions stored in one or more non-transient computer-readable storage media. AV 100 may include one or more processors that may execute the instructions to implement controller 102. AV 100 may include one or more processors that may be specially designed to implement functionalities of controller 102. Additional details relating to controller 102 are described in relation to FIG. 7. Some exemplary methods implemented by controller 102 are described with FIG. 33.

Exemplary Actuatable Tiles in Different Positions or States

When actuatable tiles change position, the contact surface of the smart ramp having the actuatable tiles effectively changes as well. Different effects on the user of the smart ramp may be achieved, depending on the state or position of the actuatable tile making contact with the user of the smart ramp. In some cases, different states or positions of one or more actuatable tiles may impact a speed of the user using the smart ramp differently. In some cases, a particular state or position of an actuatable tile may cause the user to stop on the smart ramp or hold/lock the user on the smart ramp in a stationary position.

Figure 8A:
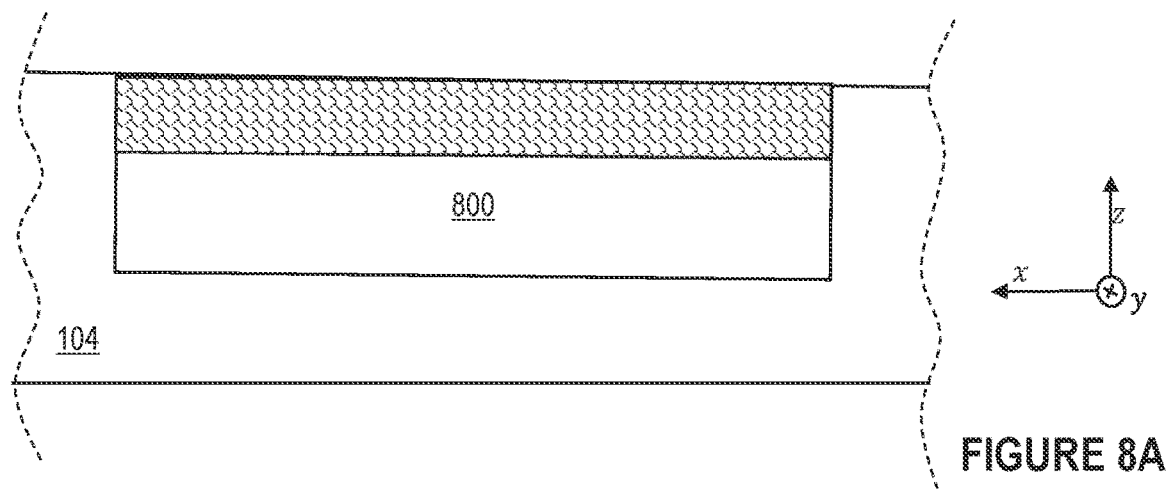
FIGS. 8A-C illustrate an exemplary actuatable tile in an unactuated state, a first actuated state, and a second actuated state, respectively, according to some embodiments of the disclosure.
Figure 8B:
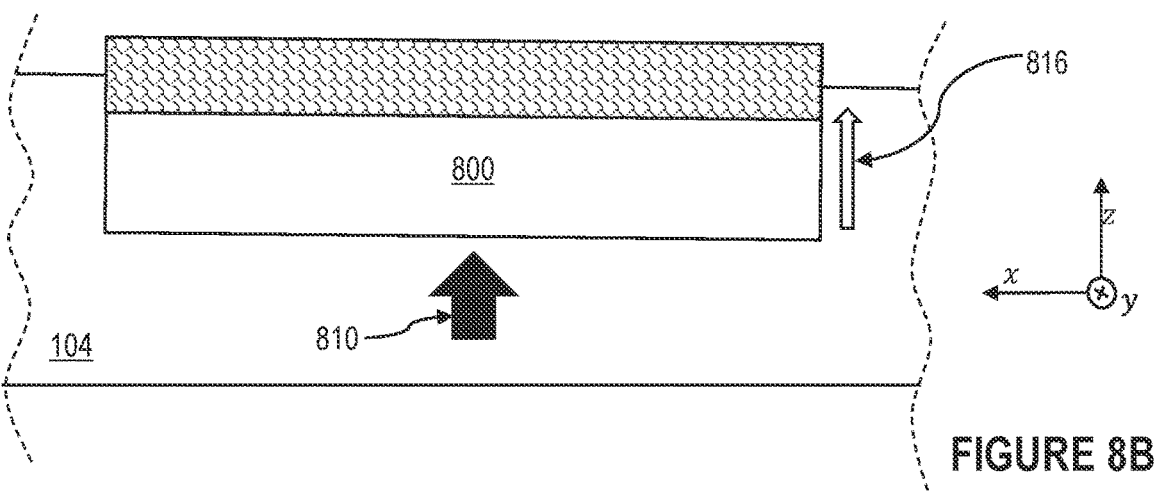
Figure 8C:
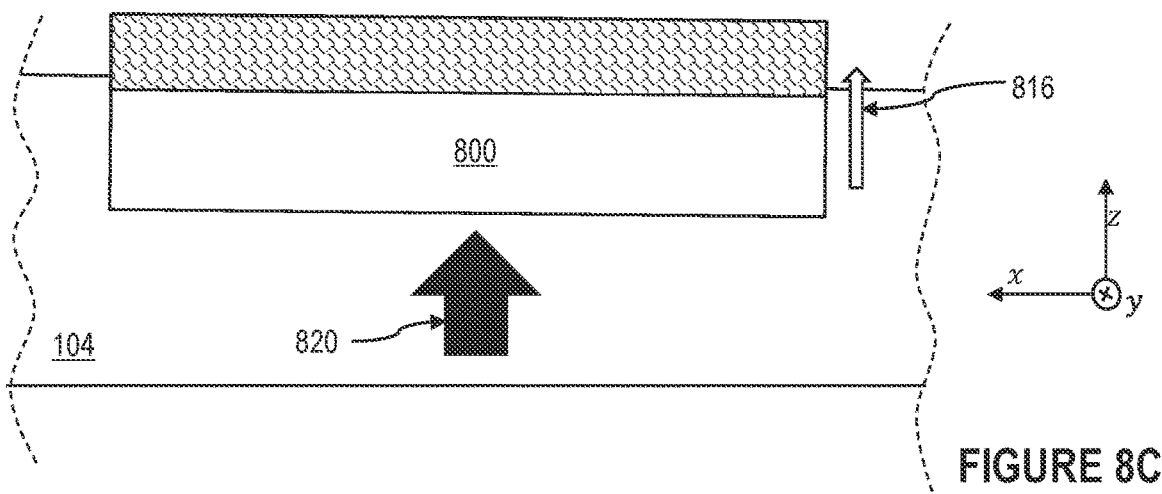

FIGS. 8A-C illustrate exemplary actuatable tile 800 in an unactuated state, a first actuated state, and a second actuated state, respectively, according to some embodiments of the disclosure. FIGS. 8A-C illustrate views of ramp 104 having actuatable tile 800, as if a cross-section is made in the plane formed in the x and z directions. Actuatable tile 800 may be moved or actuated by a tile actuator. The tile actuator may be controlled by a controller (e.g., controller 102 illustrated in the FIGURES) to move the actuatable tile 800 linearly between different positions of the actuatable tile 800. The linear movement of actuatable tile 800 is illustrated by arrow 816. Actuatable tile 800 may be actuated by a tile actuator to move up or down, or translate in position, in a linear fashion. In FIG. 8A, actuatable tile 800 is in an unactuated state or position. Depending on the implementation of the tile actuator and actuatable tile 800, tile actuator may apply a force to hold actuatable tile 800 in an unactuated position. In some cases, actuatable tile 800 is in an unactuated position due to gravity. In FIG. 8B, actuatable tile 800 is in a first actuated state or position. A tile actuator may apply a force to actuatable tile 800 (e.g., exemplary force shown as arrow 810) to cause actuatable tile 800 to move linearly upwards to the first actuated state or position. In FIG. 8C, actuatable tile 800 is in a second actuated state or position, which may involve movement of actuatable tile 800 to a greater extent than the first actuated state or position. A tile actuator may apply a force to actuatable tile 800 (e.g., exemplary force shown as arrow 820) to cause actuatable tile 800 to move linearly upwards to the second actuated state or position. Different effects on the user of ramp 104 may be achieved, depending on the state or position of actuatable tile 800 contacting the user of ramp 104. In some cases, different states or positions of actuatable tile 800 may impact the speed of the user using ramp 104 differently. In some cases, a particular state or position of actuatable tile 800 may cause the user to stop on ramp 104 or holds the user on ramp 104 in a stationary position.

Figure 9A:
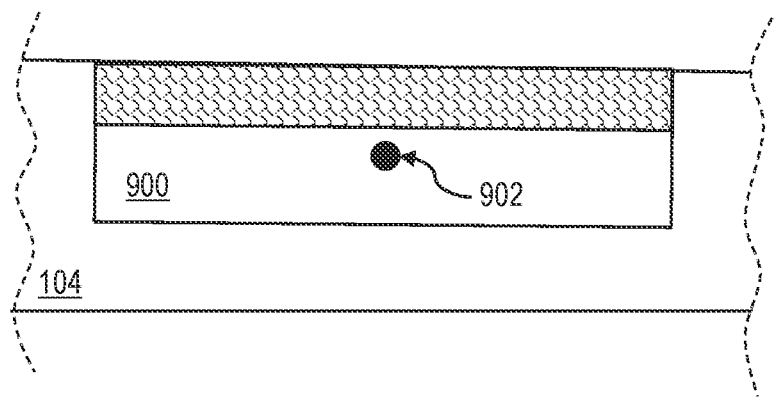
FIGS. 9A-D illustrate an exemplary actuatable tile in an unactuated state, a first actuated state, a second actuated state, a third actuated state, respectively, according to some embodiments of the disclosure.
Figure 9B:
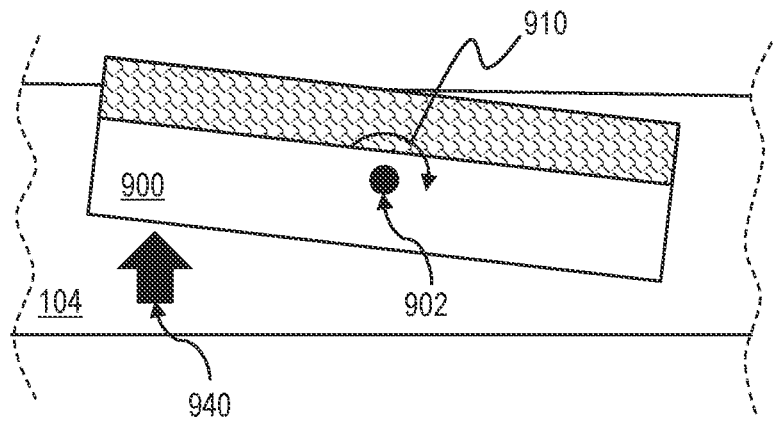
Figure 9C:
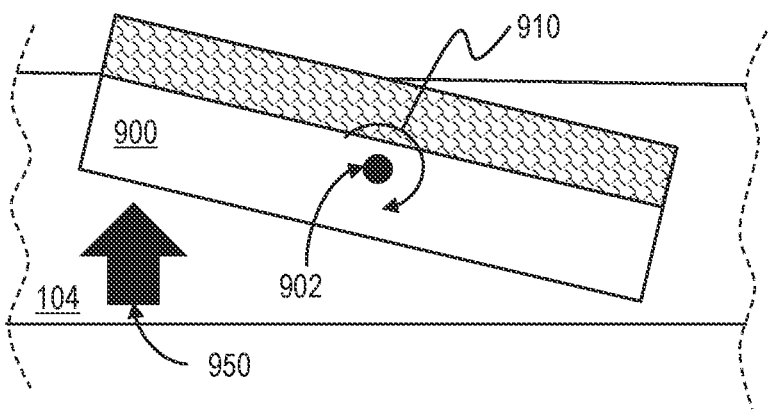
Figure 9D:
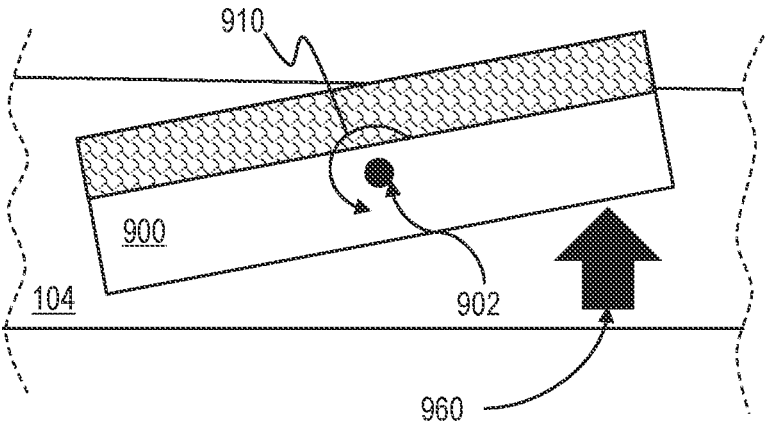

FIGS. 9A-D illustrate exemplary actuatable tile 900 in an unactuated state, a first actuated state, a second actuated state, a third actuated state, respectively, according to some embodiments of the disclosure. FIGS. 9A-D illustrate a view of ramp 104 having actuatable tile 900, as if a cross-section is made in the plane formed in the x and z directions. Actuatable tile 900 may be moved or actuated by a tile actuator. The tile actuator may be controlled by a controller (e.g., controller 102 illustrated in the FIGURES) to rotate the actuatable tile 900 between different positions of the actuatable tile 900 about an axis (shown as point 902). Point 902 may be located at a center of gravity of actuatable tile 900. Point 902 may be located in a center point of actuatable tile 900 in the cross-section of actuatable tile. Point 902 may be located in a point that enables the actuatable tile 900 to rest in an unactuated state/position without having to apply a force to the actuatable tile 900. The rotational movement of actuatable tile 900 is illustrated by arrow 910. Actuatable tile 800 may be actuated by a tile actuator to move up or down, or translate in position, in a linear fashion. In FIG. 8A, actuatable tile 800 is in an unactuated state or position. Depending on the implementation of the tile actuator and actuatable tile 900, tile actuator may apply one or more forces to hold actuatable tile 900 in an unactuated position. In FIG. 9B, actuatable tile 900 is in a first actuated state or position. A tile actuator may apply a force to actuatable tile 900 (e.g., exemplary force shown as arrow 940) to cause actuatable tile 900 to rotate about point 902 in a direction shown by arrow 910 clockwise to the first actuated state or position. In some cases, a different force may be applied to cause the same movement. In FIG. 8C, actuatable tile 900 is in a second actuated state or position, which may involve movement of actuatable tile 900 to a greater extent than the second actuated state or position. A tile actuator may apply a force to actuatable tile 900 (e.g., exemplary force shown as arrow 950) to cause actuatable tile 900 to rotate about point 902 in a direction shown by arrow 910 clockwise to the second actuated state or position. In some cases, a different force may be applied to cause the same movement. In FIG. 9D, actuatable tile 900 is in a third actuated state or position. The third actuated state or position and the first actuated state or position may involve movement by the actuator may move actuatable tile 900 by a same or similar extent from the unactuated position, but in the opposite directions. A tile actuator may apply a force to actuatable tile 900 (e.g., exemplary force shown as arrow 960) to cause actuatable tile 900 to rotate about point 902 in a direction shown by arrow 910 counterclockwise to the third actuated state or position. In some cases, a different force may be applied to cause the same movement.

In some embodiments, the tile actuator may be controlled by a controller (e.g., controller 102 illustrated in the FIGURES) to pivot the actuatable tile between different positions of the actuatable tile about a point. The point may be located near or at a first end of an actuatable tile. Similar to FIGS. 8A-C and 9A-D, the tile actuator may apply a force to a second end (at a certain distance from the first end) of the actuatable tile to change positions/states or the actuatable tile Exemplary Manners for Selectively Actuating the Actuatable Tiles Depending on which actuatable tile(s) are selectively actuated and/or to which extent the selected actuatable tile(s) are actuated, different effects on the user of the smart ramp may be achieved. The subset of actuatable tiles may be identified or determined based on the position of the user on the smart ramp. The position of the user on the smart ramp may be defined based on different reference coordinate frames. In some cases, the position of the user on a smart ramp may be defined by coordinates in a three-dimensional space. In some cases, the position of the user on the smart ramp may be defined based on a location or point along the length of the smart ramp (e.g., along the x axis). In some cases, the position of the user on the smart ramp may be defined based on an elevation of the user (e.g., how far away the user is from the ground surface). A controller may select actuatable tiles and/or determine how to actuate the selected actuatable tiles based on a desired speed at which the user wishes to travel on the ramp. A controller may select actuatable tiles and/or determine how to actuate the selected actuatable tiles based on the direction of travel. A controller may change a selection of the actuatable tiles to actuate in accordance with the desired speed of the user going up or down the ramp. A controller may change a selection of the actuatable tiles to actuate in accordance with the desired direction of travel of the user.

Certain subset of actuatable tiles may be actuated to prevent a user from rolling down the smart ramp too quickly or unintentionally. This manner of selective actuation may be performed by sensing the position of the user on the smart ramp, and actuating one or more actuatable tiles which are "downhill" from the user on the smart ramp. An actuatable tile that is "downhill" on an incline created by the smart ramp can mean that an actuatable tile is closer to the ground surface than the position of the user. By actuating those actuatable tiles, the user may be slowed down or stopped by the actuated actuatable tiles. This mechanism may be used when a user is intending to go up the smart ramp. Actuated actuatable tiles "downhill" can prevent the user from rolling down the ramp unintentionally and can hold/lock the user in place as the user goes up the ramp. This mechanism may be used when a user is intending to go down the smart ramp. Actuated actuatable tiles "downhill" can prevent the user from rolling down the ramp too quickly or above a certain desired speed. In some cases, the actuated states to achieve may be different depending on the intended direction of travel and the effect to achieve on the user. The controller may determine how to actuate the "downhill" tiles (e.g., to what extent to move the tiles) based on the direction of travel.

In some embodiments, a controller may select actuatable tiles that are closer to the ground surface relative to the position of the user on the ramp (e.g., position of the wheel of a wheeled carrier) to actuate.

In some embodiments, the controller may determine that the direction of travel is up the ramp from a ground surface towards a vehicle cabin of a vehicle. The controller may select one or more of the actuatable tiles that are closer to the ground surface relative to the position of the user to actuate. The controller may not select one or more of the actuatable tiles that are at the position of the user or higher from the ground surface relative to the position of the user to actuate (or keep the actuatable tiles in an unactuated state).

Figure 10A:
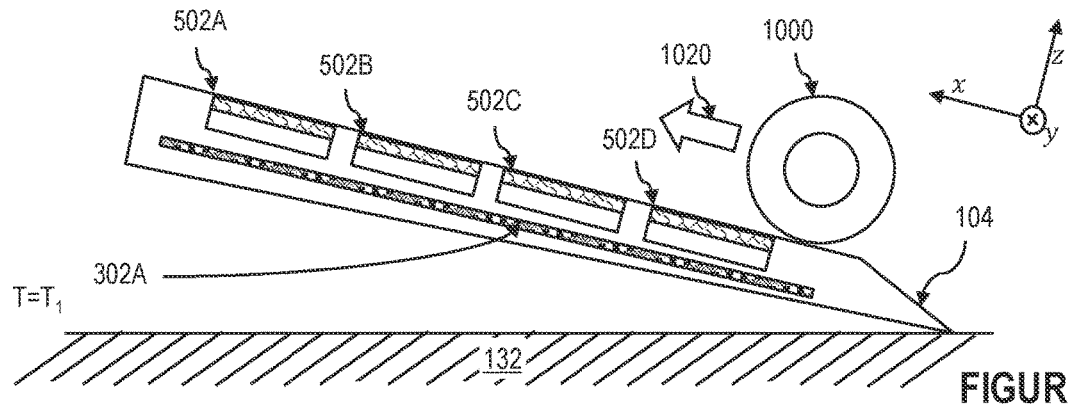
FIGS. 10A-C illustrate an exemplary wheel going up an exemplary smart ramp and illustrative actuatable tiles that are selectively actuated based on the position of the exemplary wheel, according to some embodiments of the disclosure.
Figure 10B:
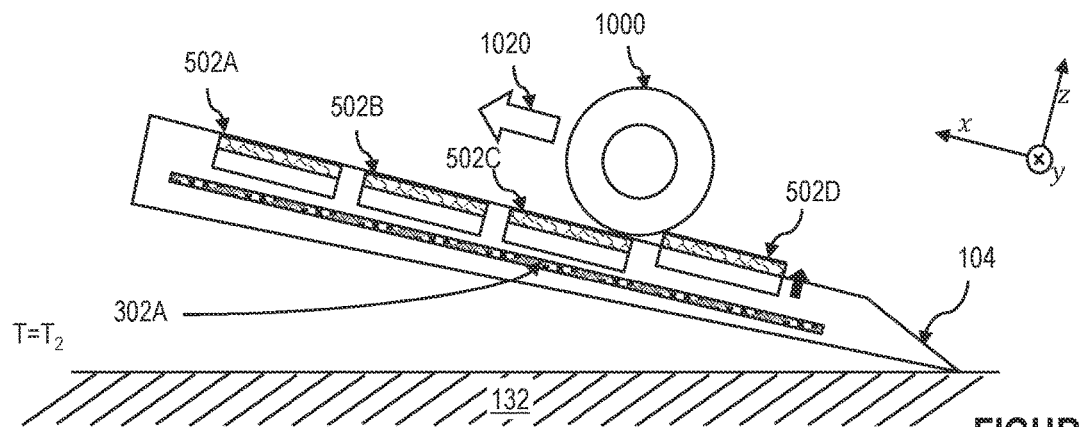
Figure 10C:
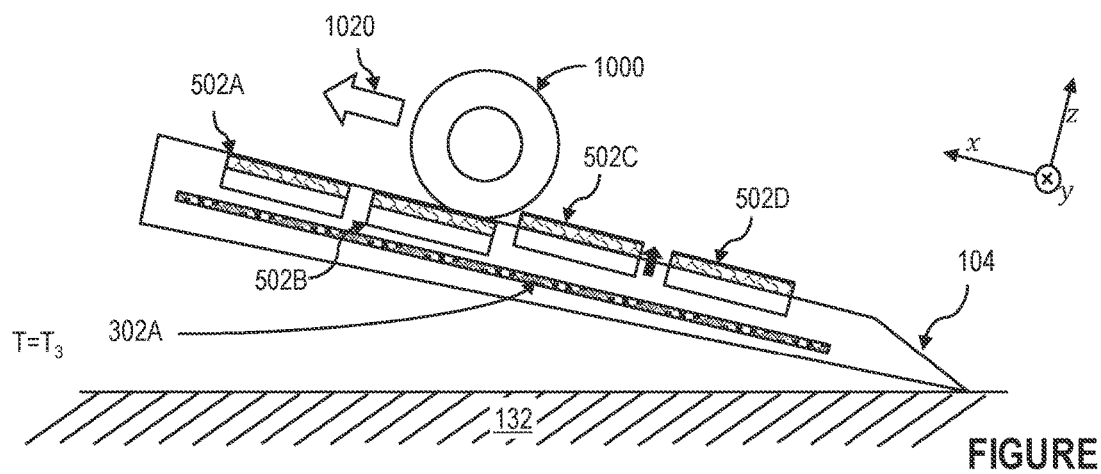

FIGS. 10A-C illustrate an exemplary user (e.g., exemplary wheel 1000) going up exemplary smart ramp 104 and illustrative actuatable tiles 502 arranged along the x direction (e.g., actuatable tile 502A, actuatable tile 502B, actuatable tile 502C, and actuatable tile 502D) that are selectively actuated based on the position of exemplary wheel 1000 and a direction of travel of the user, according to some embodiments of the disclosure. FIGS. 10A-C illustrate views of ramp 104 having actuatable tiles 502, as if a cross-section is made in the plane formed in the x and z directions. First linear position sensor 302A is an example of a sensor which can sense a position and/or direction of travel of the user. Other sensors (such as ones described herein) may be used to sense a position and/or direction of travel of the user. Sensor data may be provided to a controller. FIGS. 10A-C illustrate the ramp 104 and actuatable tiles 502 at times $T_1$, $T_2$, and $T_3$ respectively. In the FIGURES, wheel 1000 may be traveling up ramp 104 in the x direction, as illustrated by arrow 1020. A controller may determine that the intended direction of travel is up ramp 104.

In FIG. 10A, one or more sensors may determine that wheel 1000 is at a position $p_1$ on ramp 104. A controller may determine that no actuatable tiles are closer to the ground surface 132 than the position $p_1$. Therefore, no actuatable tiles are actuated, or all actuatable tiles 502 are in an unactuated state. It may be desirable to keep actuatable tiles 502 in an unactuated state so that the wheel can travel up ramp 104 easily.

In FIG. 10B, one or more sensors may determine that wheel 1000 is at a position $p_2$ on ramp 104. A controller may determine that actuatable tile 502D is closer to the ground surface 132 than the position $p_2$. Other actuatable tiles (e.g., actuatable tiles 502A-C) are farther away from the ground surface 132 than the position $p_2$. The controller may cause actuatable tile 502D to be in an actuated state (e.g., in a raised position) to prevent wheel 1000 from rolling down ramp 104.

In FIG. 10C, one or more sensors may determine that wheel 1000 is at a position $p_3$ on ramp 104. A controller may determine that actuatable tile 502C and actuatable tile 502D are closer to the ground surface 132 than the position $p_3$. Other actuatable tiles (e.g., actuatable tiles 502A-B) are farther away from the ground surface 132 than the position $p_3$. The controller may cause one or more actuatable tiles that are "downhill" of wheel 1000 to be actuated. The controller may cause all actuatable tiles that are "downhill" of wheel 1000 to be actuated. The controller may cause actuatable tile 502C (closest to wheel 1000 and "downhill" of wheel 1000 on ramp) to be in an actuated state (e.g., in a raised position) to prevent wheel 1000 from rolling down ramp 104. The controller may cause actuatable tile 502D ("downhill" of wheel 1000 on ramp) to be in an actuated state or remain in an actuated state to prevent wheel 1000 from rolling down ramp 104 further below actuatable tile 502C.

In some embodiments, the actuatable tiles may be selectively actuated to create a moving, undulating contact surface of the smart ramp. The moving, undulated contact surface may move a user up the smart ramp in a controlled manner. The moving, undulated contact surface may move a user down the smart ramp in a controlled manner (at a certain speed). This manner of selective actuation may be performed by sensing the position of the user on the smart ramp and an intended (desired or sensed) direction of travel of the user. Based on the position of the user and the intended direction of travel of the user, selective actuation may actuate one or more actuatable tiles which are "uphill" and/or "downhill" from the user on the smart ramp and put the actuatable tile(s) that the user is contacting in an unactuated state/position. In some cases, selective actuation may cause the actuatable tile(s) that the user is contacting to slowly change position. Selective actuation may cause the actuatable tile(s) that the user is contacting to slowly lower down, to allow the user to move down the ramp slowly or in a controlled manner in the intended direction of travel. Selective actuation may cause the actuatable tile(s) that the user is contacting to slowly rise, to allow the user to move up the ramp slowly or in a controlled manner in the intended direction of travel. Actuated actuatable tiles may form a hump or bump of a rolling wave. Unactuated actuatable tiles may form a dip or valley of a rolling wave. By activating actuatable tiles in a rolling wave manner, the actuatable tiles may facilitate and/or cause movement of the user in the intended direction of travel. This mechanism may be used when a user is intending to go up the smart ramp. The rolling wave may travel upwards on the ramp to push the user towards the intended direction of travel. This mechanism may be used when a user is intending to go down the smart ramp. The rolling wave may travel downwards on the ramp to controllably allow the user to roll down in the intended direction of travel. By controlling the movement of the actuatable tiles across the contact surface, the actuatable tiles may control how quickly the user moves in the intended direction of travel. By controlling the movement of the actuatable tiles across the contact surface, the actuatable tiles may slow down the user if the user is moving in the opposite direction of the intended direction of travel. By controlling the movement of the actuatable tiles across the contact surface, the actuatable tiles may stop the user from moving in the opposite direction of the intended direction of travel.

In some embodiments, a controller may change a selection of the actuatable tiles to actuate as the position of the user on the ramp changes.

In some embodiments, the controller may determine the direction of travel is down the ramp towards ground surface from a vehicle cabin of a vehicle. The controller may select one or more of the actuatable tiles 502 that are closer to the ground surface relative to the position of user to actuate.

In some embodiments, the controller may determine the direction of travel is down the ramp towards a ground surface from a vehicle cabin of a vehicle. The controller may generate and transmit commands to change positions of an actuatable tile at a position of the wheel (the actuatable tile that the wheel has just reached on the ramp), e.g., slowly change the actuatable tile at the position of the user to be from one of the actuated states to the unactuated state. This mechanism may slowly lower the user down the smart ramp.

In some embodiments, the controller may determine the direction of travel is up the ramp 104 away from a ground surface 132 towards a vehicle cabin of a vehicle. The controller may generate and transmit commands to change positions of an actuatable tile at a position of the wheel (e.g., the actuatable tile that the wheel has just reached on the ramp), e.g., slowly change the actuatable tile at the position of the wheel to be from an unactuated state to one or more actuated states. This mechanism may slowly push the user up ramp 104.

FIGS. 11A-E illustrate an exemplary user (e.g., exemplary wheel 1100) going down an exemplary smart ramp and illustrative actuatable tiles 502 arranged along the x direction (e.g., actuatable tile 502A, actuatable tile 502B, actuatable tile 502C, and actuatable tile 502D) that are selectively actuated based on the position of exemplary wheel 1100 and a direction of travel of the user, according to some embodiments of the disclosure. FIGS. 11A-E illustrate views of ramp 104 having actuatable tiles 502, as if a cross-section is made in the plane formed in the x and z directions. First linear position sensor 302A is an example of a sensor which can sense a position and/or direction of travel of the user. Other sensors (such as ones described herein) may be used to sense a position and/or direction of travel of the user. Sensor data may be provided to a controller. FIGS. 11A-E illustrate the ramp 104 and actuatable tiles 502 at times $T_1$, $T_2$, $T_3$, $T_4$, and $T_5$ respectively. In the FIGURES, wheel 1100 may be traveling down ramp 104 in the x direction, as illustrated by arrow 1120. A controller may determine that the intended direction of travel is down ramp 104.

Figure 11A:
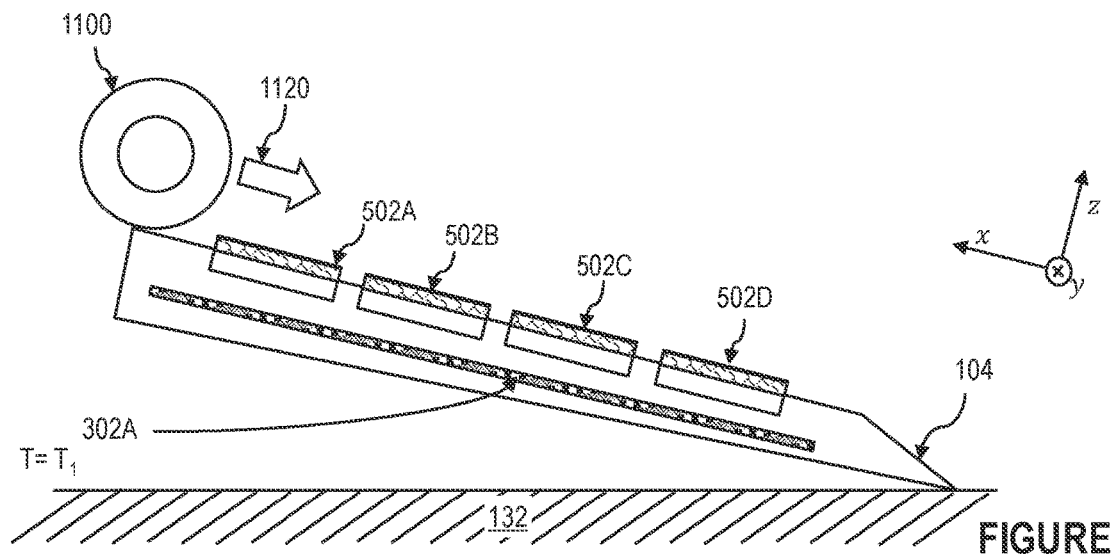
FIGS. 11A-E illustrate an exemplary wheel going down an exemplary smart ramp and illustrative actuatable tiles that are selectively actuated based on the position of the exemplary wheel, according to some embodiments of the disclosure.

In FIG. 11A, one or more sensors may determine that wheel 1100 is at a position $p_4$ on ramp 104. A controller may determine that all actuatable tiles are closer to the ground surface than the position $p_4$. The controller may cause one or more actuatable tiles that are "downhill" of wheel 1100 to be actuated. The controller may cause all actuatable tiles that are "downhill" of wheel 1100 to be actuated. The controller may cause actuatable tile 502A (closest to wheel 1100 and "downhill" of wheel 1000 on ramp) to be in an actuated state (e.g., in a raised position) to prevent wheel 1100 from rolling down ramp 104 or rolling down the ramp 104 too quickly. The controller may cause actuatable tile 502B ("downhill" of wheel 1000 on ramp) to be in an actuated state to prevent wheel 1000 from rolling down ramp 104 further below actuatable tile 502A. The controller may cause actuatable tile 502C ("downhill" of wheel 1000 on ramp) to be in an actuated state to prevent wheel 1000 from rolling down ramp 104 further below actuatable tile 502B. The controller may cause actuatable tile 502D ("downhill" of wheel 1000 on ramp) to be in an actuated state to prevent wheel 1000 from rolling down ramp 104 further below actuatable tile 502C.

Figure 11B:
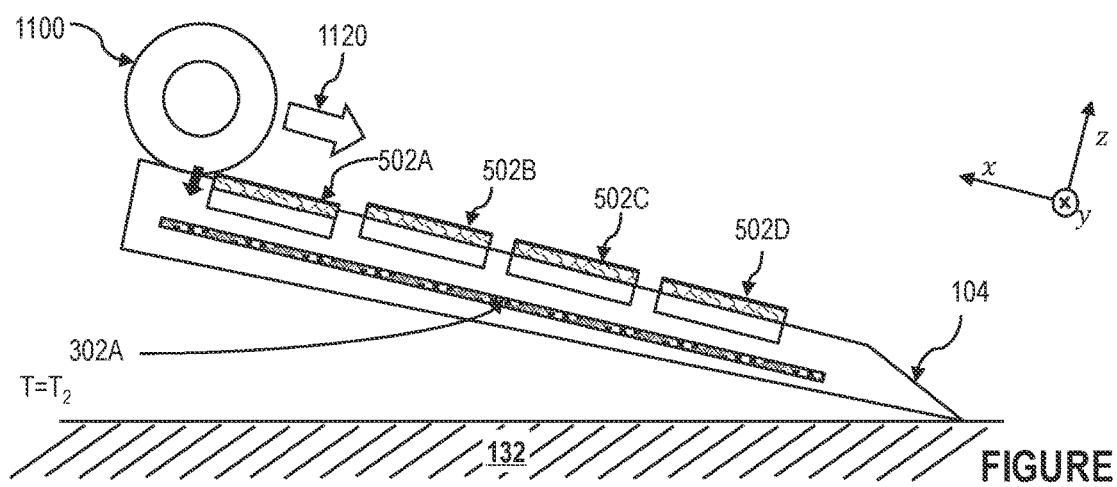

In FIG. 11B, one or more sensors may determine that wheel 1100 is at a position $p_5$ on ramp 104. A controller may determine that actuatable tiles 502B-D are closer to the ground surface than the position $p_5$. The controller may cause one or more actuatable tiles 502B-D that are "downhill" of wheel 1100 to remain actuated. The controller may determine that wheel 1100 is at actuatable tile 502A and may cause actuatable tile 502A to slowly lower in position (or slowly reach an unactuated state). The controller may determine how quickly to change the positions of actuatable tile 502A based on a user-provided speed setting.

Figure 11C:
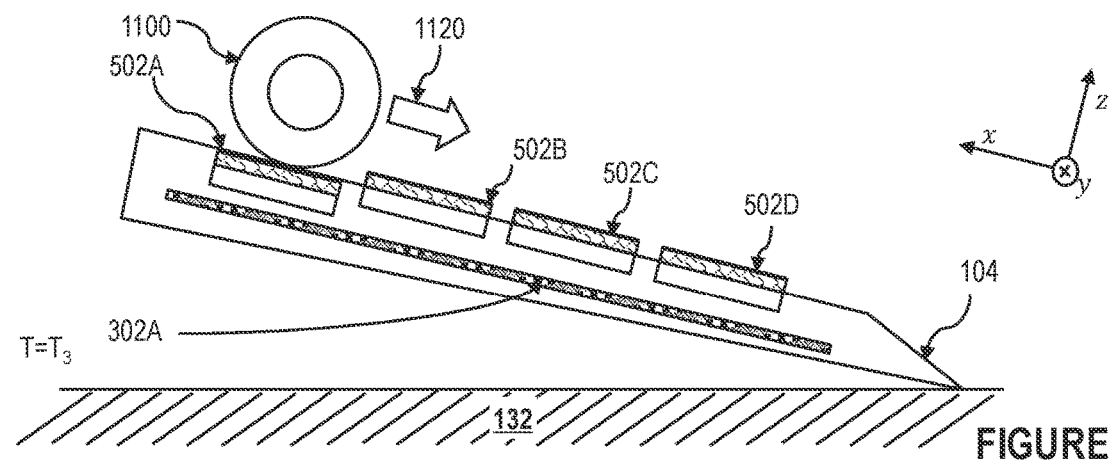

In FIG. 11C, one or more sensors may determine that wheel 1100 is at a position $p_6$ on ramp 104. A controller may determine that actuatable tiles 502B-D are closer to the ground surface than the position $p_6$. The controller may cause one or more actuatable tiles 502B-D that are "downhill" of wheel 1100 to remain actuated. The controller may determine that wheel 1100 is on actuatable tile 502A and may continue to cause actuatable tile 502A to reach or remain in an unactuated state.

Figure 11D:
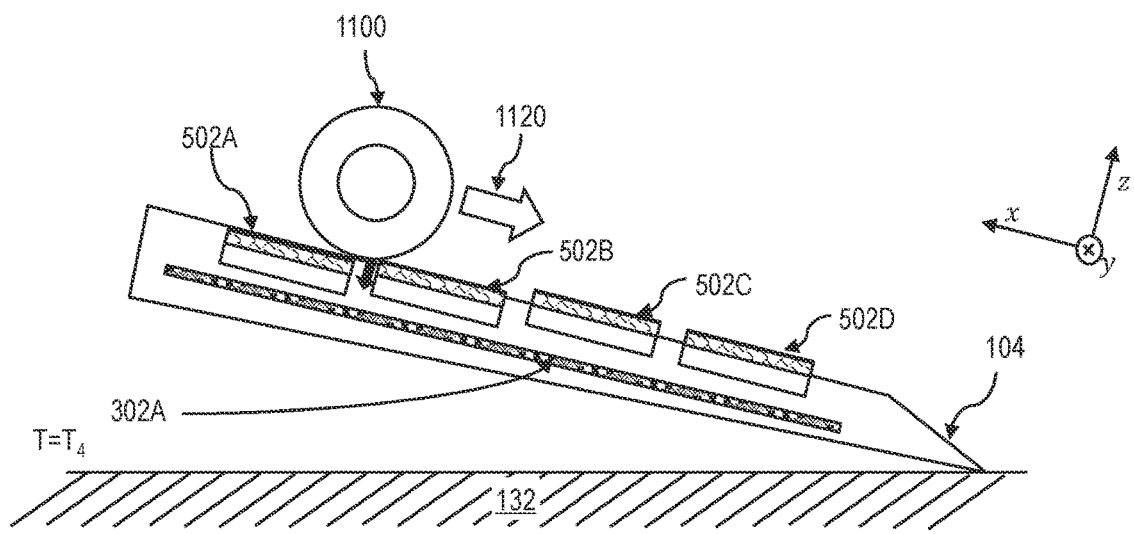
Figure 11E:
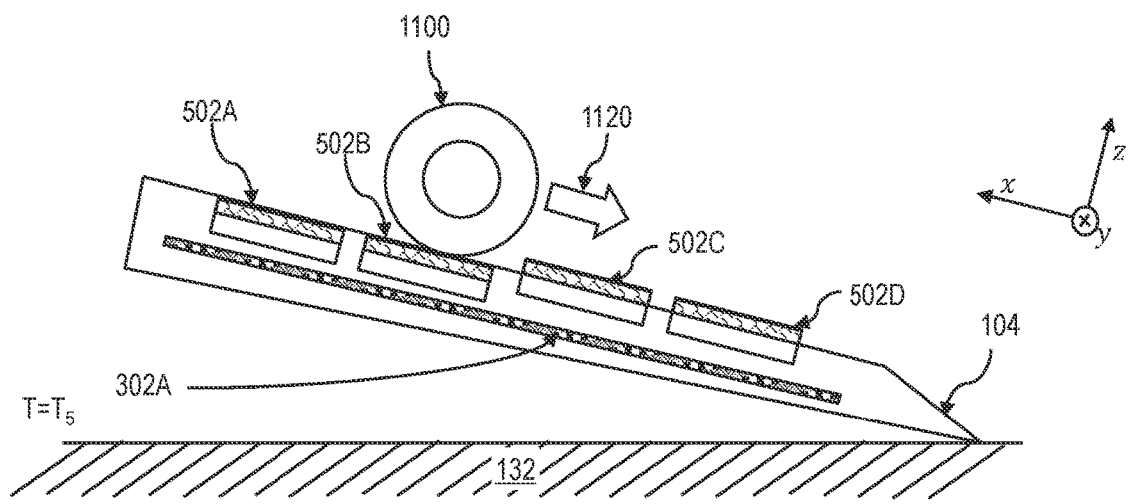

In FIG. 11D, one or more sensors may determine that wheel 1100 is at a position $p_7$ on ramp 104. A controller may determine that actuatable tiles 502C-D are closer to the ground surface than the position $p_7$. The controller may cause one or more actuatable tiles 502C-D that are "downhill" of wheel 1100 to remain actuated. The controller may cause actuatable tile 502A which is "uphill" of wheel 1100 to remain in an unactuated state. The controller may determine that wheel 1100 is on or at actuatable tile 502B and may cause actuatable tile 502B to slowly lower in position (or slowly reach an unactuated state). The controller may determine how quickly to change the positions of actuatable tile 502B based on a user-provided speed setting.

In FIG. 11C, one or more sensors may determine that wheel 1100 is at a position $p_8$ on ramp 104. A controller may determine that actuatable tiles 502C-D are closer to the ground surface than the position $p_8$. The controller may cause one or more actuatable tiles 502C-D that are "downhill" of wheel 1100 to remain actuated. The controller may cause actuatable tile 502A which is "uphill" of wheel 1100 to remain in an unactuated state. The controller may determine that wheel 1100 is on actuatable tile 502B and may continue to cause actuatable tile 502B to reach or remain in an unactuated state.

The process may continue similarly as wheel 1100 descends down ramp 104.

Exemplary Designs of Actuatable Tiles

Various shapes of the top surfaces of actuatable tiles may impact a user of the smart ramp differently when the actuatable tiles are in an unactuated state. The shapes of top surfaces may offer more or less grip or traction than others. Various shapes of the top surfaces of actuatable tiles may impact a user of the smart ramp differently when the actuatable tiles are in an actuated state. Impact on a user of the smart ramp may differ depending on how the user interacts with an actuatable tile and how the actuatable tile is actuated.

Figure 12:
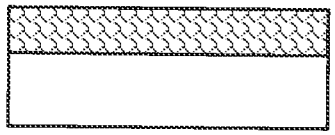
FIGS. 12-21 show side views of exemplary actuatable tiles, according to some embodiments of the disclosure.
Figure 13:
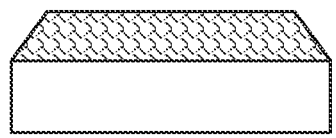
Figure 14:
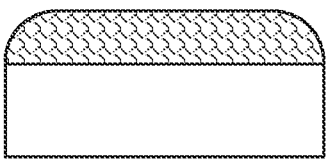
Figure 15:
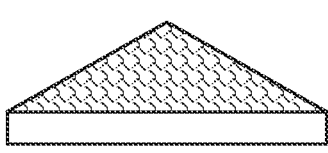
Figure 16:
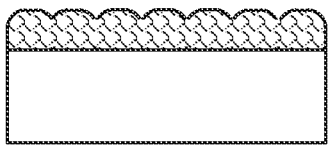
Figure 17:
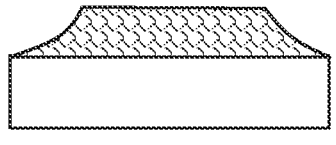
Figure 18:
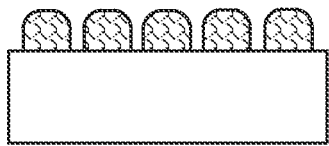
Figure 19:
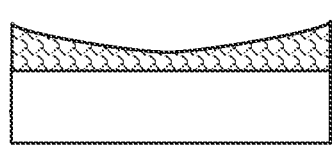
Figure 20:
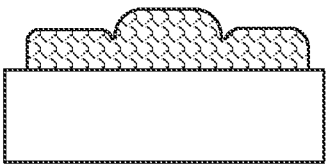
Figure 21:
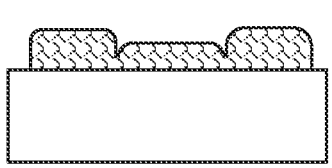

FIGS. 12-21 show side views of exemplary actuatable tiles, according to some embodiments of the disclosure. FIGS. 12-21 illustrate views of exemplary tiles, as if a cross-section is made in the plane formed in the x and z directions. FIG. 12 illustrates an actuatable tile that has a top surface with cornered edges. FIG. 13 illustrates an actuatable tile that has a top surface with cut edges (e.g., a trapezoidal cross-section). FIG. 14 illustrates an actuatable tile that has a top surface with rounded edges. FIG. 15 illustrates an actuatable tile that has a pyramid shaped top surface. FIG. 16 illustrates an actuatable tile that has a bumpy uneven top surface. FIG. 17 illustrates an actuatable tile that has a top surface with cut edges (e.g., a trapezoidal cross-section where sides are concaved). FIG. 18 illustrates an actuatable tile that has a bumpy uneven top surface with tread-like surface. FIG. 19 illustrates an actuatable tile that has an uneven top surface with a concave surface and raised edges. FIG. 20 illustrates an actuatable tile that has a bumpy, uneven top surface with a raised center area. FIG. 21 illustrates an actuatable tile that has a bumpy, uneven top surface with a raised outer area.

Exemplary Geometric Spatial Arrangement of Actuatable Tiles

Various shapes of actuatable tiles may impact a user of the smart ramp differently. Some shapes, depending on whether the shape is symmetrical along the y axis and the shape's orientation on the smart ramp, may cause a different effect depending the direction of the user traveling on the actuated tile. For example, a pointy side (offering less contact points) may offer less ability to slow down the user than a flat or round side (offering more contact points) of an actuated tile. Certain actuatable tiles may be selected by a controller (e.g., ones having a certain desired shape) based on the desired speed of travel up and/or down the ramp. Actuatable tiles may be arranged in an orientation that facilitates controlling the speed of ascent or descent of a user on the ramp.

Figure 22:
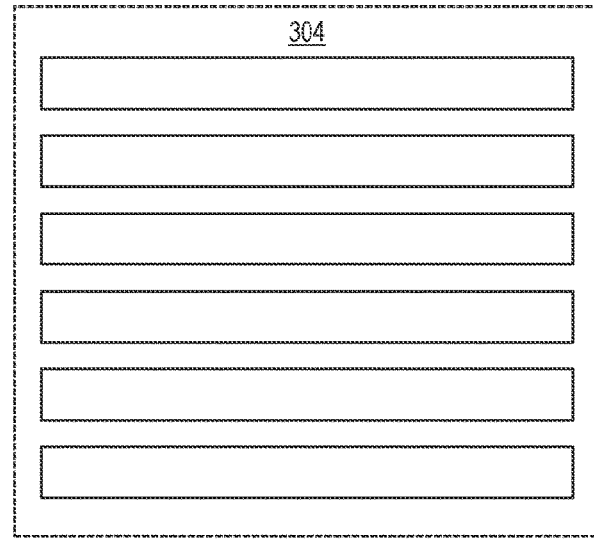
FIGS. 22-32 illustrate exemplary patterns in which actuatable tiles may be arranged spatially across a contact side of a smart ramp, according to some embodiments of the disclosure.
Figure 23:
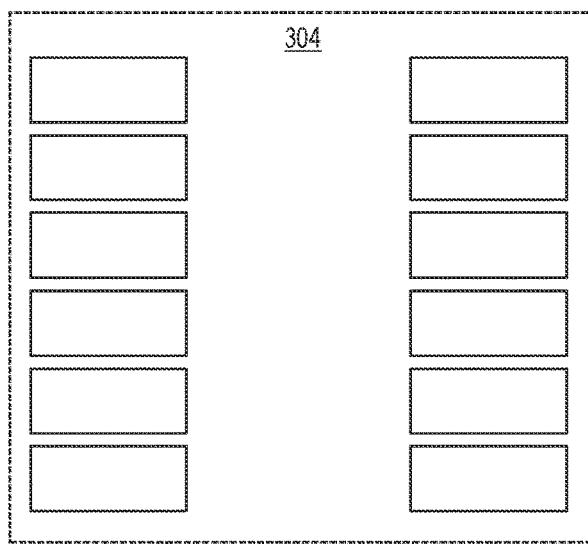
Figure 24:
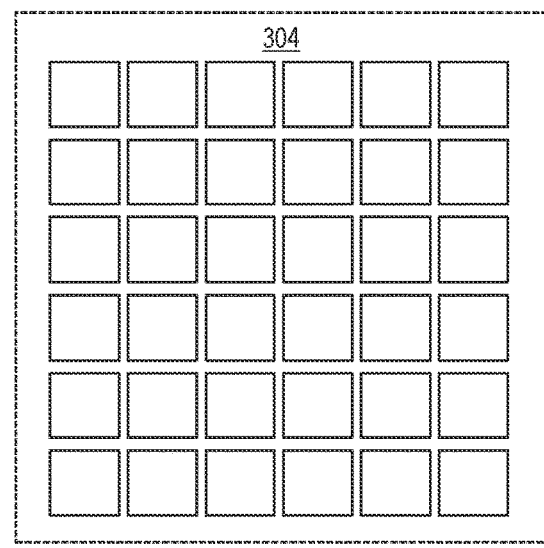
Figure 25:
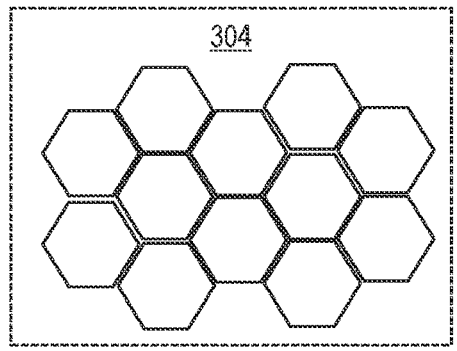
Figure 27:
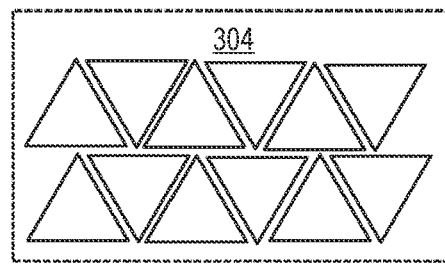
Figure 26:
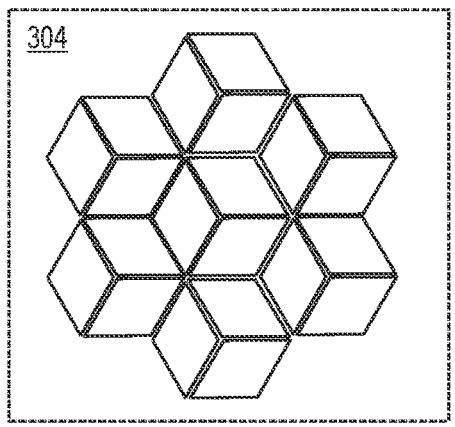
Figure 28:
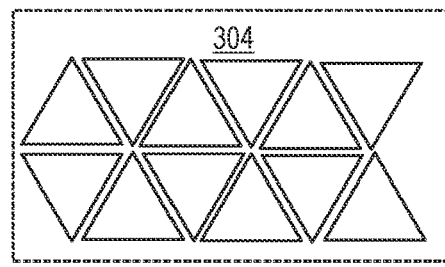
Figure 29:
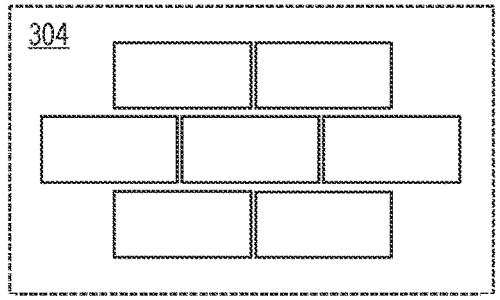
Figure 31:
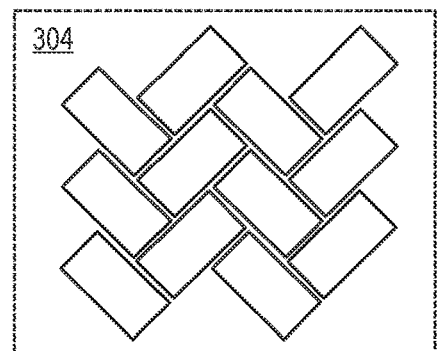
Figure 30:
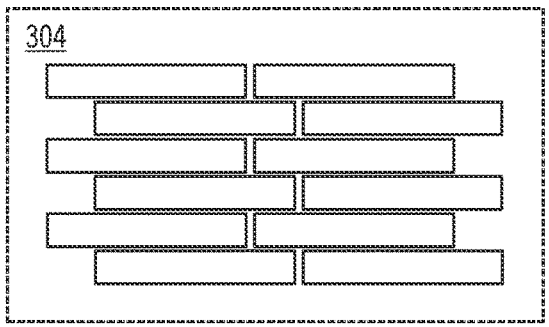
Figure 32:
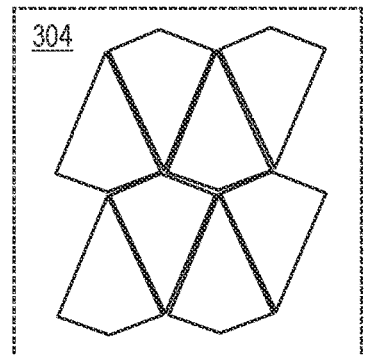

FIGS. 22-32 illustrate exemplary patterns in which actuatable tiles may be arranged spatially across a contact side of a smart ramp, according to some embodiments of the disclosure. FIGS. 22-32 illustrate exemplary patterns, when directly viewing a contact side of the smart ramp within region 304 on a plane formed in the x and y directions. Patterns in FIGS. 22-23 may or may not depict the complete pattern arranged within region 304 and are meant to be illustrative of a geometric pattern. FIG. 22 illustrates individual actuatable tiles spanning a width of region 304. FIG. 23 illustrates actuatable tiles arranged on two sides of region 304 (e.g., where wheels on the ramp are expected to contact). FIG. 24 illustrates a grid of actuatable tiles arranged and spanning region 304. FIG. 25 illustrates a geometric pattern of actuatable tiles with a hexagon shape arranged across region 304. FIG. 26 illustrates a geometric pattern of actuatable tiles with a diamond shape arranged across region 304. FIG. 27 illustrates a geometric pattern of actuatable tiles with a triangular shape arranged across region 304. FIG. 28 illustrates a different geometric pattern of actuatable tiles with a triangular shape arranged across region 304. FIG. 29 illustrates a geometric pattern of actuatable tiles with a rectangular shape (e.g., 50% offset) arranged across region 304. FIG. 30 illustrates a geometric pattern of actuatable tiles with a rectangular shape (e.g., 20% offset) arranged across region 304. FIG. 31 illustrates a geometric pattern of actuatable tiles with a rectangular shape arranged across region 304 in a herringbone pattern. FIG. 32 illustrates a geometric pattern of actuatable tiles with a kite-like shape arranged across region 304.

Exemplary Methods for Controlling a Smart Ramp

Figure 33:
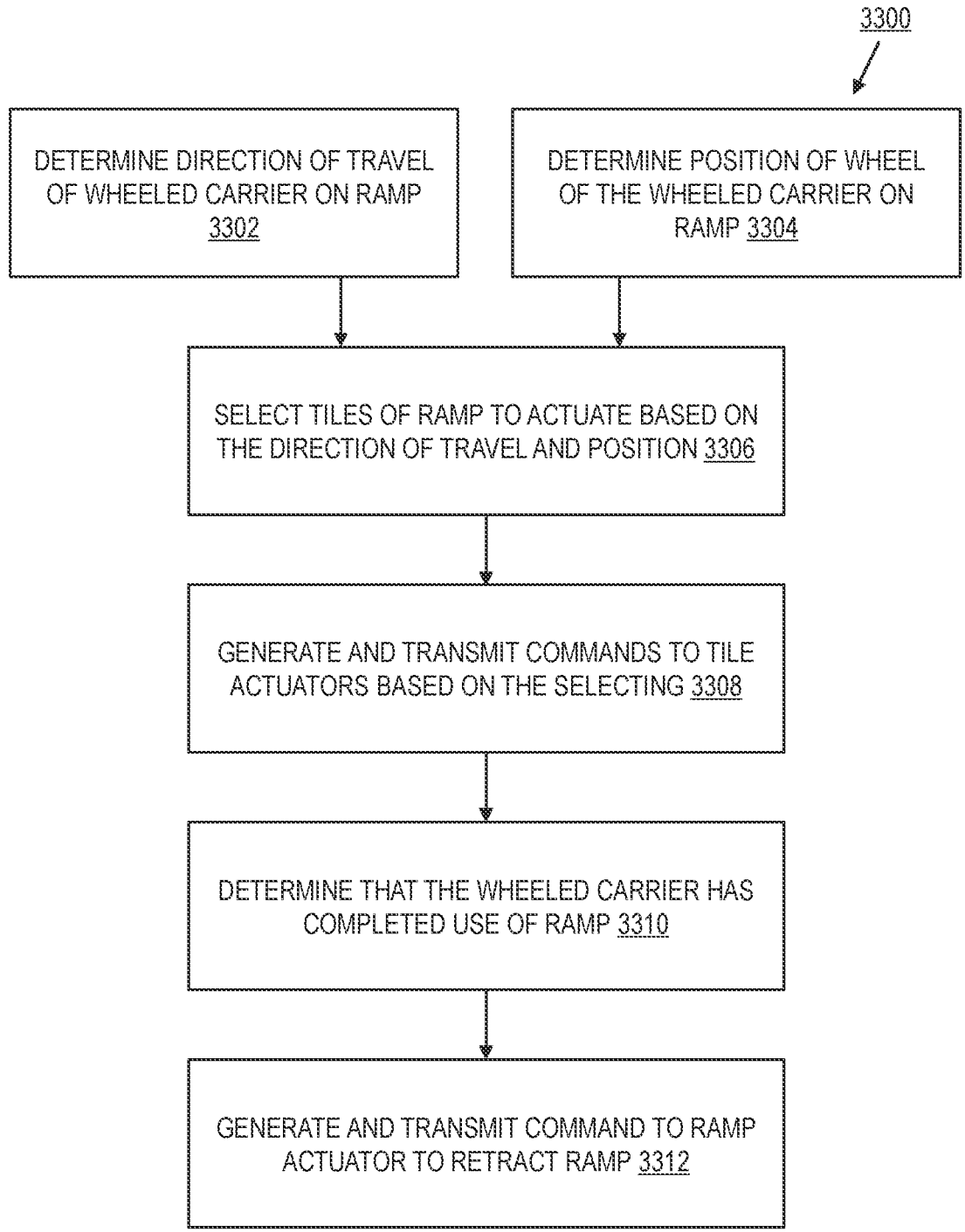
FIG. 33 is a flow diagram illustrating an exemplary method for controlling a ramp for a passenger vehicle, according to some embodiments of the disclosure.

FIG. 33 is a flow diagram illustrating an exemplary method for controlling a ramp for a passenger vehicle, according to some embodiments of the disclosure. The method can be implemented or carried out by a controller (e.g., controller 102 of the FIGURES) or another suitable component associated with a vehicle.

In 3302, a controller may determine the direction of travel of a wheeled carrier on the ramp for entering and/or exiting the passenger vehicle.

In 3304, the controller may determine the position of a wheel of the wheeled carrier on a contact side of the ramp based on data sensed by one or more sensors.

In 3306, the controller can select at least a subset of actuatable tiles to actuate based on the direction of travel and the position. The actuatable tiles can be arranged on the contact side of the ramp.

In 3308, the controller can generate and transmit commands to one or more tile actuators corresponding to the selected subset of the actuatable tiles to actuate the selected subset of the actuatable tiles.

In 3310, the controller may determine that the wheeled carrier has completed a use of the ramp.

In 3312, the controller may generate and transmit a command to a ramp actuator to retract the ramp.

Prior to 3302 and/or 3304, the controller may determine that the wheeled carrier is expected to use the ramp. The controller may generate and transmit a command to a ramp actuator to extend the ramp.

In 3302, the direction of travel may be determined in a variety of ways. In some cases, determining the direction of travel can include receiving a voice command, e.g., via a user I/O device, from a human indicating that the human is expected to enter a vehicle cabin of the passenger vehicle (e.g., "I am entering the vehicle!"), and determining that the direction of travel is to go up the ramp in response to receiving the voice command. In some cases, determining the direction of travel can include receiving a voice command, e.g., via a user I/O device, from a human indicating that the human is expected to exit a vehicle cabin of the passenger vehicle (e.g., "I am leaving the vehicle!"), and determining that the direction of travel is to go down the ramp in response to receiving the voice command. The controller may use audio processing techniques and/or artificial intelligence to understand or interpret the voice command and deduce a direction of travel.

In some cases, determining the direction of travel in 3302 can include receiving a user input (e.g., a button press, or some other suitable user input that can be input using a user I/O device) from a human indicating that the human is expected to enter a vehicle cabin of the passenger vehicle, and determining that the direction of travel is to go up the ramp in response to receiving the user input command. For example, the user input may be received via a ride hailing or delivery application on a user I/O device. In some cases, determining the direction of travel can include receiving a user input (e.g., a button press, or some other suitable user input that can be input using a user I/O device) from a human indicating that the human is expected to exit a vehicle cabin of the passenger vehicle, and determining that the direction of travel is to go down the ramp in response to receiving the user input command. For example, the user input may be received via a ride hailing or delivery application on a user I/O device.

In some cases, determining the direction of travel in 3302 can be based on a determined use context. Determining the direction of travel may include determining a human expected to use the ramp is outside a vehicle cabin of the passenger vehicle and determining that the direction of travel is to go up the ramp in response to the determining that the human is outside the vehicle cabin. In some cases, determining the direction of travel can include determining a human expected to use the ramp is inside a vehicle cabin of the passenger vehicle, and determining that the direction of travel is to go down the ramp in response to the determining that the human is inside the vehicle cabin. The controller may infer the direction of travel from the user context.

In some cases, determining the direction of travel can include receiving position information of the wheeled carrier from one or more sensors (e.g., sensor data indicating position of the user), and deriving the direction of travel based on a change in the position information.

Exemplary AV Management System and Processor-Based System

Figure 34:
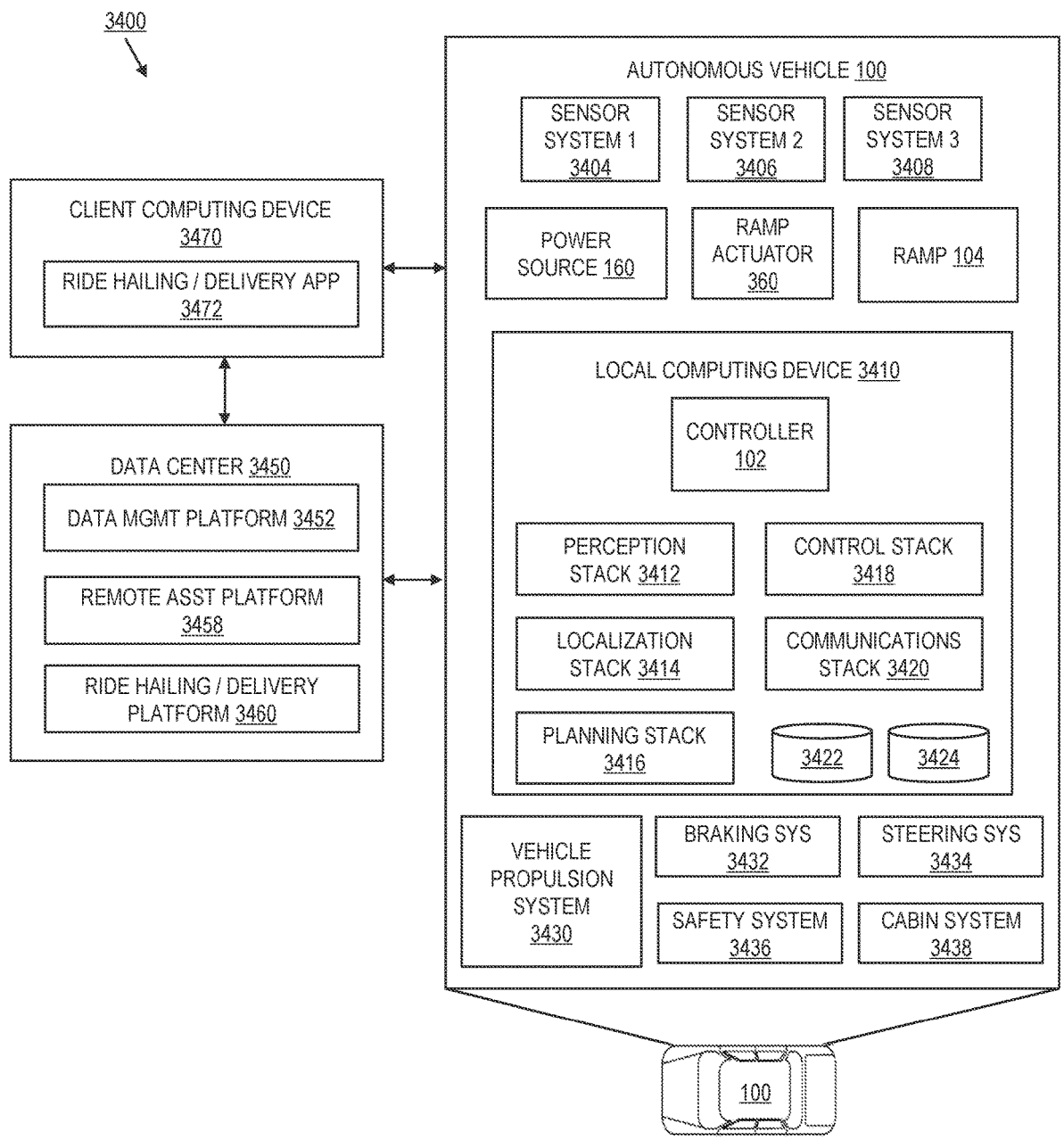
FIG. 34 illustrates an exemplary system environment that can be used to facilitate autonomous vehicle dispatch and operations, according to some embodiments of the disclosure.

FIG. 34 illustrates an exemplary AV management system 3400 environment that can be used to facilitate autonomous vehicle dispatch and operations in providing AV-enabled services, according to some embodiments of the disclosure. In this example, the AV management system 3400 includes an AV 100, a data center 3450, and a client computing device 3470 (which can be an example of user I/O device 260 in the FIGURES). The AV 100, the data center 3450, and the client computing device 3470 can communicate with one another over one or more networks (not shown).

AV 100 may include power source 160, ramp actuator 360, and ramp 104 as described with the FIGURES.

AV 100 can navigate roadways without a human driver based on sensor signals generated by multiple sensor systems 3404, 3406, and 3408. The sensor systems 3404-3408 can include different types of sensors and can be arranged about the AV 100. For instance, the sensor systems 3404-3408 can comprise IMUs, cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, SONAR systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 3404 can be a camera system, the sensor system 3406 can be a LIDAR system, and the sensor system 3408 can be a RADAR system. Other embodiments may include any other number and type of sensors. The sensor systems 3404-3408 can be used in a similar fashion as the sensors described in the FIGURES to collect sensor data that can be used for determining position of a user on a ramp 104 and/or a direction of travel of the user.

AV 100 can also include several mechanical and electrical systems that can be used to maneuver or operate AV 100. For instance, the mechanical and electrical systems can include vehicle propulsion system 3430, braking system 3432, steering system 3434, safety system 3436, and cabin system 3438, among other systems. The systems can include vehicle signal lights and vehicle horn. Vehicle propulsion system 3430 can include an electric motor, an internal combustion engine, or both. The braking system 3432 can include an engine brake, a wheel braking system (e.g., a disc braking system that utilizes brake pads), hydraulics, actuators, and/or any other suitable componentry configured to assist in decelerating AV 100. The steering system 3434 can include suitable componentry configured to control the direction of movement of the AV 100 during navigation. Safety system 3436 can include lights and signal indicators, a parking brake, airbags, and so forth. The cabin system 3438 can include cabin temperature control systems, in-cabin entertainment systems, and so forth. In some embodiments, the AV 100 may not include human driver actuators (e.g., steering wheel, handbrake, foot brake pedal, foot accelerator pedal, turn signal lever, window wipers, etc.) for controlling the AV 100. Instead, the cabin system 3438 can include one or more client interfaces (e.g., Graphical User Interfaces (GUIs), Voice User Interfaces (VUIs), etc.) for controlling certain aspects of the mechanical systems 3430-3438.

AV 100 can additionally include a local computing device 3410 (an example of computing system 3500 in FIG. 35) that is in communication with the sensor systems 3404-3408, the mechanical systems 3430-3438, the data center 3450, and the client computing device 3470, among other systems. The local computing device 3410 can include one or more processors and memory, including instructions that can be executed by the one or more processors. The instructions can make up one or more software stacks or components responsible for controlling the AV 100; communicating with the data center 3450, the client computing device 3470, and other systems; receiving inputs from riders, passengers, and other entities within the AV's environment; logging metrics collected by the sensor systems 3404-3408; and so forth. In this example, the local computing device 3410 includes a perception stack 3412, a mapping and localization stack 3414, a planning stack 3416, a control stack 3418, a communications stack 3420, a High Definition (HD) geospatial database 3422, and an AV operational database 3424, among other stacks and systems. Local computing device 3410 may include controller 102 or may be communicably connected to controller 102.

Perception stack 3412 can enable the AV 100 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 3404-3408, the mapping and localization stack 3414, the HD geospatial database 3422, other components of the AV, and other data sources (e.g., the data center 3450, the client computing device 3470, third-party data sources, etc.). The perception stack 3412 can detect and classify objects and determine their current and predicted locations, speeds, directions, and the like. In addition, the perception stack 3412 can determine the free space around the AV 100 (e.g., to maintain a safe distance from other objects, change lanes, park the AV, etc.). The perception stack 3412 can also identify environmental uncertainties, such as where to look for moving objects, flag areas that may be obscured or blocked from view, and so forth.

Mapping and localization stack 3414 can determine the AV's position and orientation (pose) using different methods from multiple systems (e.g., GPS, IMUs, cameras, LIDAR, RADAR, ultrasonic sensors, the HD geospatial database 3422, etc.). For example, in some embodiments, the AV 100 can compare sensor data captured in real-time by the sensor systems 3404-3408 to data in the HD geospatial database 3422 to determine its precise (e.g., accurate to the order of a few centimeters or less) position and orientation. The AV 100 can focus its search based on sensor data from one or more first sensor systems (e.g., GPS) by matching sensor data from one or more second sensor systems (e.g., LIDAR). If the mapping and localization information from one system is unavailable, the AV 100 can use mapping and localization information from a redundant system and/or from remote data sources.

The planning stack 3416 can determine how to maneuver or operate the AV 100 safely and efficiently in its environment. Planning stack 3416 can generate and output path data and/or driving maneuver data of the AV 100. For example, the planning stack 3416 can receive the location, speed, and direction of the AV 100, geospatial data, data regarding objects sharing the road with the AV 100 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 100 from one point to another. The planning stack 3416 can determine multiple sets of one or more mechanical operations that the AV 100 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 3416 can select from multiple backup plans to carry out. For example, while preparing to change lanes to turn right at an intersection, another vehicle may aggressively cut into the destination lane, making the lane change unsafe. The planning stack 3416 could have already determined an alternative plan for such an event, and upon its occurrence, help to direct the AV 100 to go around the block instead of blocking a current lane while waiting for an opening to change lanes.

The control stack 3418 can manage the operation of the vehicle propulsion system 3430, the braking system 3432, the steering system 3434, the safety system 3436, and the cabin system 3438. The control stack 3418 can receive sensor signals from the sensor systems 3404-3408 as well as communicate with other stacks or components of the local computing device 3410 or a remote system (e.g., the data center 3450) to effectuate operation of the AV 100. For example, the control stack 3418 can implement the final path or actions from the multiple paths or actions provided by the planning stack 3416. This can involve turning the routes and decisions from the planning stack 3416 into commands for the actuators that control the AV's steering, throttle, brake, and drive unit.

The communication stack 3420 can transmit and receive signals between the various stacks and other components of the AV 100 and between the AV 100, the data center 3450, the client computing device 3470, and other remote systems. The communication stack 3420 can enable the local computing device 3410 to exchange information remotely over a network.

The HD geospatial database 3422 can store HD maps and related data of the streets upon which the AV 100 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 3424 can store raw AV data generated by the sensor systems 3404-3408 and other components of the AV 100 and/or data received by the AV 100 from remote systems (e.g., the data center 3450, the client computing device 3470, etc.). In some embodiments, the raw AV data can include HD LIDAR point-cloud data, image or video data, RADAR data, GPS data, and other sensor data that the data center 3450 can use for creating or updating AV geospatial data. In some examples, data center 3450 can include user profiles.

The data center 3450 can be a private cloud (e.g., an enterprise network, a co-location provider network, etc.), a public cloud, a hybrid cloud, a multi-cloud, and so forth. Data center 3450 can include one or more computing devices remote to the local computing device 3410 for managing a fleet of AVs and AV-related services. For example, in addition to managing the AV 100, the data center 3450 may also support a ride hailing service, a delivery service, a remote/roadside assistance service, street services (e.g., street mapping, street patrol, street cleaning, street metering, parking reservation, etc.), and the like.

The data center 3450 can send and receive various signals to and from the AV 100 and the client computing device 3470. These signals can include sensor data captured by the sensor systems 3404-3408, roadside assistance requests, software updates, ride hailing/delivery pick-up and drop-off instructions, and so forth. In this example, the data center 3405 includes one or more of a data management platform 3452, a remote assistance platform 3458, and a ride hailing/delivery platform 3460, among other systems.

Data management platform 3452 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ride hailing/delivery service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 3450 can access data stored by the data management platform 3452 to provide their respective services.

The remote assistance platform 3458 can generate and transmit instructions regarding the operation of the AV 100.

The ride hailing/delivery platform 3460 can interact with a customer of a ride hailing/delivery service via a ride hailing/delivery application 3472 executing on the client computing device 3470. The ride hailing/delivery platform 3460 may store user-specified or user-provided preferences, such as user-specified speed settings for going up and/or down ramp 104. If appropriate, ride hailing/delivery platform 3460 may provide user-specified or user-provided preferences to controller 102. The client computing device 3470 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ride hailing/delivery application 3472. The client computing device 3470 can be a customer's mobile computing device, an in-vehicle mobile computing device or a computing device integrated with the AV 100 (e.g., the local computing device 3410). The ride hailing/delivery platform 3460 can receive requests to be picked up or dropped off from the ride hailing/delivery application 3472 and dispatch the AV 100 for the trip. The client computing device 3470 may be an example of a user I/O device 260 described in the FIGURES.

Figure 35:
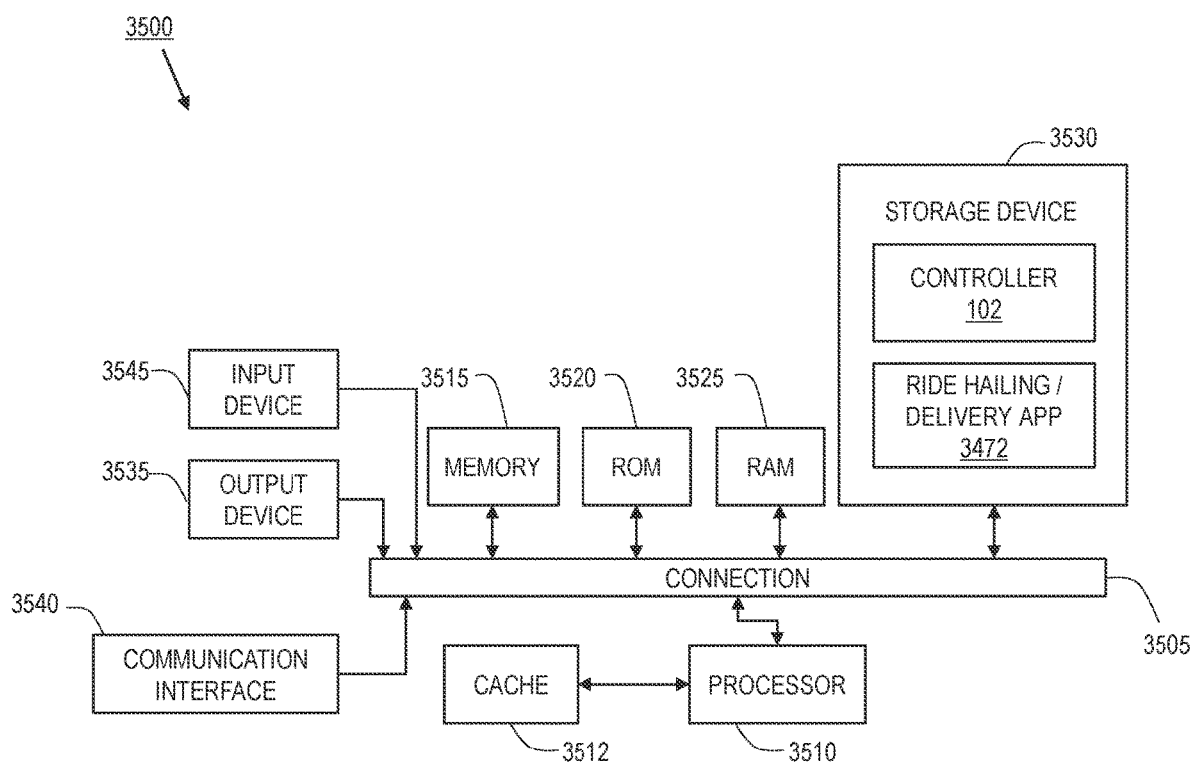
FIG. 35 illustrates an exemplary processor-based system with which some aspects of the subject technology can be implemented.

FIG. 35 illustrates an exemplary processor-based or computing system with which some aspects of the subject technology (e.g., methods illustrated in FIG. 15) can be implemented. For example, processor-based system 3500 can be any computing device making up, or any component thereof in which the components of the system are in communication with each other using connection 3505. Connection 3505 can be a physical connection via a bus, or a direct connection into processor 3510, such as in a chipset architecture. Connection 3505 can also be a virtual connection, networked connection, or logical connection.

In some embodiments, computing system 3500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Exemplary system 3500 includes at least one processing unit (Central Processing Unit (CPU), Graphical Processing Unit (GPU), Machine Learning Processor, Neural Network Processor, or some other suitable processor) 3510 and connection 3505 that couples various system components including system memory 3515, such as Read-Only Memory (ROM) 3520 and Random-Access Memory (RAM) 3525 to processor 3510. Computing system 3500 can include a cache of high-speed memory 3512 connected directly with, in close proximity to, or integrated as part of processor 3510.

Processor 3510 can include any general-purpose processor and a hardware service or software service, such as controller 102, and ride hailing/delivery application 3472 stored in storage device 3530, configured to control processor 3510 as well as a special-purpose processor where software instructions are incorporated into the actual processor design. Processor 3510 may essentially be a completely self-contained computing system, containing multiple cores or processors, a bus, memory controller, cache, etc. A multi-core processor may be symmetric or asymmetric.

To enable user interaction, computing system 3500 includes an input device 3545, which can represent any number of input mechanisms, such as a microphone for speech, a touch-sensitive screen for gesture or graphical input, keyboard, mouse, motion input, speech, etc. Computing system 3500 can also include output device 3535, which can be one or more of a number of output mechanisms known to those of skill in the art. Output device 3535 may be used to output digital token(s) to a user of the computing system 3500. In some instances, multimodal systems can enable a user to provide multiple types of input/output to communicate with computing system 3500. Computing system 3500 can include communications interface 3540, which can generally govern and manage the user input and system output. The communication interface may perform or facilitate receipt and/or transmission of wired or wireless communications via wired and/or wireless transceivers.

Communication interface 3540 may also include one or more GNSS receivers or transceivers that are used to determine a location of the computing system 3500 based on receipt of one or more signals from one or more satellites associated with one or more GNSS systems. There is no restriction on operating on any particular hardware arrangement, and therefore the basic features here may easily be substituted for improved hardware or firmware arrangements as they are developed.

Storage device 3530 can be a non-volatile and/or non-transitory and/or computer-readable memory device and can be a hard disk or other types of computer-readable media which can store data that is accessible by a computer. Storage device 3530 may store data that may be used by controller 102. Storage device 3530 can include software services, servers, services, etc., that when the code that defines such software is executed by the processor 3510, it causes the system 3500 to perform a function. In some embodiments, a hardware service that performs a particular function can include the software component stored in a computer-readable medium in connection with the necessary hardware components, such as processor 3510, connection 3505, output device 3535, etc., to carry out the function. Storage device 3530 may store instructions that can implement functionalities of components such as controller 102, and ride hailing/delivery application 3472.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general-purpose or special-purpose computer, including the functional design of any special-purpose processor as described above. By way of example, and not limitation, such tangible computer-readable devices can include storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 is a passenger vehicle, comprising: a vehicle cabin to transport one or more passengers, a ramp stowaway area; a ramp comprising: actuatable tiles arranged across a contact side of the ramp, and tile actuators to selectively actuate the actuatable tiles; a ramp actuator to extend the ramp from the ramp stowaway area to a ground surface, and retract the ramp from the ground surface to the ramp stowaway area; one or more sensors to sense a position of a wheel of a wheeled carrier on the ramp; a processor; and one or more non-transient computer-readable storage media to store instructions executable by the processor to implement a controller, wherein the controller determines a direction of travel of the wheeled carrier, and generates one or more commands to the tile actuators to selectively actuate the actuatable tiles based on the direction of travel and the position sensed by the one or more sensors.

In Example 2, the passenger vehicle of Example 1 can optionally include the vehicle cabin including a wheeled mobility device securement system to secure a wheeled mobility device, and the ramp is to allow the wheeled mobility device to enter and exit the vehicle cabin.

In Example 3, the passenger vehicle of Example 1 or 2 can optionally include the ramp stowaway area being underneath a vehicle floor of the vehicle cabin.

In Example 4, the passenger vehicle of Example 1 or 2 can optionally include the ramp stowaway area being inside a vehicle floor of the vehicle cabin.

In Example 5, the passenger vehicle of any one of Examples 1-4 can optionally include the actuatable tiles (or at least some of the actuatable tiles) each comprising a top surface made from rubber material.

In Example 6, the passenger vehicle of any one of Examples 1-5 can optionally include the actuatable tiles (or at least some of the actuatable tiles) each comprising an uneven top surface.

In Example 7, the passenger vehicle of any one of Examples 1-6 can optionally include the actuatable tiles (or at least some of the actuatable tiles) each having positions comprising an unactuated position and one or more actuated positions, and the tile actuators being to cause respective actuatable tiles to be in one of the positions.

In Example 8, the passenger vehicle of any one of Examples 1-7 can optionally include the tile actuators moving the actuatable tiles linearly between different positions of the actuatable tiles.

In Example 9, the passenger vehicle of any one of Examples 1-7 can optionally include the tile actuators rotating the actuatable tiles about an axis between different positions of the actuatable tiles.

In Example 10, the passenger vehicle of any one of Examples 1-7 can optionally include the tile actuators pivoting the actuatable tiles about a point between different positions of the actuatable tiles.

In Example 11, the passenger vehicle of any one of Examples 1-10 wherein the actuatable tiles are arranged in a geometric pattern spatially across the contact side of a ramp.

In Example 12, the passenger vehicle of any one of Examples 1-11 can optionally include the one or more sensors to sense the position of the wheel of the wheeled carrier comprising a camera in the vehicle cabin.

In Example 13, the passenger vehicle of any one of Examples 1-12 can optionally include the one or more sensors to sense the position of the wheel of the wheeled carrier comprising a camera located outside of the vehicle cabin on the passenger vehicle.

In Example 14, the passenger vehicle of any one of Examples 1-13 can optionally include the one or more sensors to sense the position of the wheel of the wheeled carrier comprises a light detecting and ranging sensor located outside of the vehicle cabin on the passenger vehicle.

In Example 15, the passenger vehicle of any one of Examples 1-14 can optionally include the one or more sensors to sense the position of the wheel of the wheeled carrier comprising a time-of-flight sensor in the vehicle cabin.

In Example 16, the passenger vehicle of any one of Examples 1-15 can optionally include the one or more sensors to sense the position of the wheel of the wheeled carrier comprising a time-of-flight sensor located outside of the vehicle cabin on the passenger vehicle.

In Example 17, the passenger vehicle of any one of Examples 1-16 can optionally include the one or more sensors to sense the position of the wheel of the wheeled carrier comprising a first linear position sensor arranged with the ramp to sense the position of the wheel along a first direction.

In Example 18, the passenger vehicle of Example 17 can optionally include the one or more sensors to sense the position of the wheel of the wheeled carrier further comprising a second linear position sensor arranged with the ramp to sense the position of the wheel along a second direction perpendicular to the first direction.

In Example 19, the passenger vehicle of any one of Examples 1-18 can optionally include the passenger vehicle further comprising a microphone, and the one or more non-transient computer-readable media further including instructions to implement an audio user interface to accept voice commands from a human, wherein the audio user interface receives audio signals from the microphone.

In Example 20, the passenger vehicle of any one of Examples 1-19 can optionally include the passenger vehicle further comprising a power source to supply power to the ramp actuator and the tile actuators.

Example 21 is a ramp for wheeled carriers and living beings to enter and/or exit a vehicle cabin of a vehicle, comprising: actuatable tiles arranged across a contact side of the ramp, and tile actuators to selectively actuate the actuatable tiles; one or more sensors to sense a position of a wheel of a wheeled carrier on the ramp; and a controller to determine a direction of travel of a wheeled carrier, and generates one or more commands to the tile actuators to selectively actuate the actuatable tiles based on the direction of travel and the position sensed by the one or more sensors.

Example 22 is a method for controlling a ramp for a passenger vehicle, comprising: determining, by a controller, a direction of travel of a wheeled carrier on the ramp for entering and/or exiting the passenger vehicle; determining, by the controller, a position of a wheel of the wheeled carrier on a contact side of the ramp based on data sensed by one or more sensors; selecting at least subset of actuatable tiles to actuate based on the direction of travel and the position, wherein the actuatable tiles are arranged on a contact side of the ramp; and generating and transmitting commands to one or more tile actuators corresponding to selected subset of the actuatable tiles to actuate the selected subset of the actuatable tiles.

In Example 23, the method of Example 22 can optionally include: determining that the wheeled carrier has completed a use of the ramp; and generating and transmitting a command to a ramp actuator to retract the ramp.

In Example 24, the method of Example 22 or 23 can optionally include determining that the wheeled carrier is expected to use the ramp; and generating and transmitting a command to a ramp actuator to extend the ramp.

In Example 25, the method of any one of Examples 22-24 can optionally include the determining, by the controller, the direction of travel comprising: receiving a voice (or user input) command from a human indicating that the human is expected to enter a vehicle cabin of the passenger vehicle; and determining that the direction of travel is to go up the ramp in response to receiving the voice (or user input) command.

In Example 26, the method of any one of Examples 22-25 can optionally include the determining, by the controller, the direction of travel comprising: receiving a voice (or user input) command from a human indicating that the human is expected to exit a vehicle cabin of the passenger vehicle; and determining that the direction of travel is to go down the ramp in response to receiving the voice (or user input) command.

In Example 27, the method of any one of Examples 22-26 can optionally include the determining, by the controller, the direction of travel comprising: determining a human expected to use the ramp is outside a vehicle cabin of the passenger vehicle; and determining that the direction of travel is to go up the ramp in response to the determining that the human is outside the vehicle cabin.

In Example 28, the method of any one of Examples 22-27 can optionally include the determining, by the controller, the direction of travel comprising: determining a human expected to use the ramp is inside a vehicle cabin of the passenger vehicle; and determining that the direction of travel is to go down the ramp in response to the determining that the human is inside the vehicle cabin.

In Example 29, the method of any one of Examples 22-28 can optionally include the determining, by the controller, the direction of travel comprising: receiving position information of the wheeled carrier from one or more sensors; and deriving the direction of travel based on a change in the position information.

In Example 30, the method of any one of Examples 22-29 can optionally include the selecting the at least subset of actuatable tiles to actuate comprising: selecting actuatable tiles that are closer to the ground surface relative to the position of the wheel to actuate.

In Example 31, the method of any one of Examples 22-30 can optionally include the selecting the at least subset of actuatable tiles to actuate comprising: changing a selection of the actuatable tiles to actuate as the position of the wheel changes.

In Example 32, the method of any one of Examples 22-31 can optionally include the selecting the at least subset of actuatable tiles to actuate comprising: determining the direction of travel is up the ramp from a ground surface towards a vehicle cabin of the passenger vehicle; selecting one or more of the actuatable tiles that are closer to the ground surface relative to the position of the wheel to actuate; and not selecting one or more of the actuatable tiles that are at the position of the wheel or higher from the ground surface relative to the position of the wheel to actuate.

In Example 33, the method of any one of Examples 22-32 can optionally include the selecting the at least subset of actuatable tiles to actuate comprising: determining the direction of travel is down the ramp towards a ground surface from a vehicle cabin of the passenger vehicle; and selecting one or more of the actuatable tiles that are closer to the ground surface relative to a position of the wheel to actuate.

In Example 34, the method of any one of Examples 22-33 can optionally include generating and transmitting commands to change positions of an actuatable tile at a position of the wheel.

In Example 35, the method of any one of Examples 22-35 can optionally include selecting an actuated state from a plurality of different actuated states for the selected actuatable tiles to actuate; and wherein the commands to the tile actuators comprise commands to cause the selected actuatable tiles to reach selected actuated state.

In Example 36, the method of Example 35 can optionally include the selecting the actuated state from the plurality of different actuated states being based on a user-provided speed setting.

Example 37 includes one or more non-transitory computer-readable media storing instructions that, when executed by one or more processors, cause the one or more processors to perform any one of the computer-implemented methods of Examples 22-36.

Example 38 is an apparatus comprising means to carry out any one of the computer-implemented methods of Examples 22-36.

What is claimed is:

1. A passenger vehicle, comprising:
   a vehicle cabin to transport one or more passengers;
   a ramp stowaway area;
   a ramp comprising:
      actuatable tiles arranged across a contact side of the ramp, and
      tile actuators to selectively actuate the actuatable tiles;
   a ramp actuator to extend the ramp from the ramp stowaway area to a ground surface, and retract the ramp from the ground surface to the ramp stowaway area;
   one or more sensors to sense a position of a wheel of a wheeled carrier on the ramp;
   a processor; and
   one or more non-transient computer-readable storage media to store instructions executable by the processor to implement a controller, wherein the controller determines a direction of travel of the wheeled carrier, and generates one or more commands to the tile actuators to selectively actuate the actuatable tiles based on the direction of travel and the position sensed by the one or more sensors.

2. The passenger vehicle of claim 1, wherein the actuatable tiles each comprises a top surface made from rubber material.

3. The passenger vehicle of claim 1, wherein the actuatable tiles each comprises an uneven top surface.

4. The passenger vehicle of claim 1, wherein the actuatable tiles each has positions comprising an unactuated position and one or more actuated positions, and the tile actuators are to cause respective actuatable tiles to be in one of the positions.

5. The passenger vehicle of claim 1, wherein the tile actuators move the actuatable tiles linearly between different positions of the actuatable tiles.

6. The passenger vehicle of claim 1, wherein the tile actuators rotate the actuatable tiles about an axis between different positions of the actuatable tiles.

7. The passenger vehicle of claim 1, wherein the tile actuators pivot the actuatable tiles about a point between different positions of the actuatable tiles.

8. The passenger vehicle of claim 1, wherein the one or more sensors to sense the position of the wheel of the wheeled carrier comprises a camera in the vehicle cabin.

9. The passenger vehicle of claim 1, wherein the one or more sensors to sense the position of the wheel of the wheeled carrier comprises a camera located outside of the vehicle cabin on the passenger vehicle.

10. The passenger vehicle of claim 1, wherein the one or more sensors to sense the position of the wheel of the wheeled carrier comprises a light detecting and ranging sensor located outside of the vehicle cabin on the passenger vehicle.

11. The passenger vehicle of claim 1, wherein the one or more sensors to sense the position of the wheel of the wheeled carrier comprises a time-of-flight sensor in the vehicle cabin.

12. The passenger vehicle of claim 1, wherein the one or more sensors to sense the position of the wheel of the wheeled carrier comprises a time-of-flight sensor located outside of the vehicle cabin on the passenger vehicle.

13. The passenger vehicle of claim 1, wherein the one or more sensors to sense the position of the wheel of the wheeled carrier comprises a first linear position sensor arranged with the ramp to sense the position of the wheel along a first direction.

14. The passenger vehicle of claim 13, wherein the one or more sensors to sense the position of the wheel of the wheeled carrier further comprises a second linear position sensor arranged with the ramp to sense the position of the wheel along a second direction perpendicular to the first direction.

15. The passenger vehicle of claim 1, wherein the passenger vehicle further comprises a microphone, and the one or more non-transient computer-readable media further includes instructions to implement an audio user interface to accept voice commands from a human, wherein the audio user interface receives audio signals from the microphone.

16. A method for controlling a ramp for a passenger vehicle, comprising:
   determining, by a controller, a direction of travel of a wheeled carrier on the ramp for entering and/or exiting the passenger vehicle;
   determining, by the controller, a position of a wheel of the wheeled carrier on a contact side of the ramp based on data sensed by one or more sensors;
   selecting at least a subset of actuatable tiles to actuate based on the direction of travel and the position, wherein the actuatable tiles are arranged on a contact side of the ramp; and
   generating and transmitting commands to one or more tile actuators corresponding to the selected subset of the actuatable tiles to actuate the selected subset of the actuatable tiles.

17. The method of claim 16, further comprises:
   generating and transmitting commands to change positions of an actuatable tile at a position of the wheel.

18. The method of claim 16, further comprising:
   selecting an actuated state from a plurality of different actuated states for the selected actuatable tiles to actuate; and
   wherein the commands to the tile actuators comprise commands to cause the selected actuatable tiles to reach the selected actuated state.

19. The method of claim 18, wherein the selecting the actuated state from the plurality of different actuated states is based on a user-provided speed setting.

20. A ramp for wheeled carriers and living beings to enter and/or exit a vehicle cabin of a vehicle, comprising:
   actuatable tiles arranged across a contact side of the ramp, and
   tile actuators to selectively actuate the actuatable tiles;
   one or more sensors to sense a position of a wheel of a wheeled carrier on the ramp; and
   a controller to determine a direction of travel of a wheeled carrier, and generate one or more commands to the tile actuators to selectively actuate the actuatable tiles based on the direction of travel and the position sensed by the one or more sensors.

* * * * *